United States Patent
Wang et al.

(10) Patent No.: US 9,992,109 B2
(45) Date of Patent: Jun. 5, 2018

(54) DATA TRANSMISSION METHOD, APPARATUS AND SYSTEM

(71) Applicant: HUAWEI TECHNOLOGIES CO., LTD., Shenzhen (CN)

(72) Inventors: Chunguang Wang, Shanghai (CN); Frank Mademann, Berlin (DE); Yanping Zhang, Shanghai (CN); Wanqiang Zhang, Beijing (CN)

(73) Assignee: HUAWEI TECHNOLOGIES CO., LTD., Shenzen (CN)

( * ) Notice: Subject to any disclaimer, the term of this patent is extended or adjusted under 35 U.S.C. 154(b) by 299 days.

(21) Appl. No.: 14/947,027

(22) Filed: Nov. 20, 2015

(65) Prior Publication Data
US 2016/0080260 A1    Mar. 17, 2016

Related U.S. Application Data

(63) Continuation of application No. PCT/CN2013/075908, filed on May 20, 2013.

(51) Int. Cl.
| | |
|---|---|
| *H04L 12/741* | (2013.01) |
| *H04L 29/08* | (2006.01) |
| *H04L 29/06* | (2006.01) |

(52) U.S. Cl.
CPC ............ *H04L 45/74* (2013.01); *H04L 67/025* (2013.01); *H04L 67/18* (2013.01); *H04L 69/02* (2013.01); *H04L 69/22* (2013.01); *H04L 2212/00* (2013.01)

(58) Field of Classification Search
None
See application file for complete search history.

(56) References Cited

U.S. PATENT DOCUMENTS

| 7,865,944 B1 | 1/2011 | Shu et al. |
| 9,439,057 B2 | 9/2016 | Bhatt et al. |

(Continued)

FOREIGN PATENT DOCUMENTS

| CN | 101369977 | 2/2009 |
| CN | 101969654 | 2/2011 |

(Continued)

OTHER PUBLICATIONS

Extended European Search Report, dated Mar. 23, 2016, in corresponding European Application No. 13885093.8 (6 pp.).

(Continued)

*Primary Examiner* — Hassan Phillips
*Assistant Examiner* — Gautam Sharma
(74) *Attorney, Agent, or Firm* — Staas & Halsey LLP

(57) ABSTRACT

Embodiments of the present invention relate to the field of communications, and provide a data transmission method, apparatus and system. The method includes: detecting whether data transmitted in a received GTP-U data packet is data of a predetermined type; if a result of the detection is that data transmitted in the GTP-U data packet is data of a predetermined type, decapsulating the GTP-U data packet, to obtain the data of the predetermined type and a destination address of the data of the predetermined type; and sending the data of the predetermined type and the destination address to a message gateway, so that the message gateway forwards the data of the predetermined type according to the destination address. A gateway includes: a detection module, a decapsulation module, and a sending module. A message gateway includes: a receiving module and a forwarding module.

11 Claims, 18 Drawing Sheets

(56) References Cited

U.S. PATENT DOCUMENTS

| | | | |
|---|---|---|---|
| 2003/0007490 A1* | 1/2003 | Yi | H04L 1/18 370/394 |
| 2003/0039246 A1* | 2/2003 | Guo | H04L 45/302 370/389 |
| 2003/0081607 A1 | 5/2003 | Kavanaugh | |
| 2006/0013190 A1* | 1/2006 | Leroy | H04L 63/029 370/349 |
| 2008/0192925 A1* | 8/2008 | Sachs | H04L 12/5692 380/29 |
| 2009/0016334 A1* | 1/2009 | Forsberg | H04W 28/06 370/389 |
| 2009/0129342 A1* | 5/2009 | Hwang | H04W 36/0022 370/331 |
| 2010/0189076 A1* | 7/2010 | Kim | H04W 36/385 370/331 |
| 2011/0113278 A1* | 5/2011 | Yin | H04L 12/4633 714/4.1 |
| 2012/0155460 A1 | 6/2012 | Gu et al. | |
| 2012/0327893 A1* | 12/2012 | Yuan | H04W 24/10 370/329 |
| 2013/0054761 A1 | 2/2013 | Kempf et al. | |
| 2013/0201989 A1* | 8/2013 | Hu | H04L 45/24 370/392 |
| 2013/0272127 A1* | 10/2013 | Ali | H04W 76/022 370/235 |
| 2014/0016614 A1* | 1/2014 | Velev | H04W 4/005 370/331 |
| 2014/0140300 A1* | 5/2014 | Barrett | H04W 4/005 370/329 |
| 2014/0242970 A1 | 8/2014 | Yu et al. | |

FOREIGN PATENT DOCUMENTS

| | | |
|---|---|---|
| CN | 102158977 | 8/2011 |
| CN | 103096291 | 5/2013 |
| JP | 2013-507056 | 2/2013 |
| WO | WO 2012/126761 A1 | 9/2012 |
| WO | WO 2013/017849 A2 | 2/2013 |

OTHER PUBLICATIONS

PCT International Search Report dated Feb. 27, 2014 in corresponding International Patent Application No. PCT/CN2013/075908.

"3rd Generation Partnership Project; Technical Specification Group Services and System Aspects; Architecture enhancements to facilitate communications with packet data networks and applications (Release 11)", 3GPP TS 23.682, V11.3.0, Dec. 2012, pp. 1-29.

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401, V12.0.0, Mar. 2013, pp. 1-290.

International Search Report dated Feb. 27, 2014, in corresponding International Application No. PCT/CN2013/075908.

Japanese Office Action dated Feb. 14, 2017 in corresponding Japanese Patent Application No. 2016-514230.

"Small data transmission", SA WG2 Meeting #86, S2-113410, IPWireless Inc., Jul. 11-15, 2011, Naantali, Finland, 6 pages.

"MTC small data identification mechanism for non-SMS Small Data Transmission Solution", SA WG2 Meeting #87, S2-114341, MediaTek Inc., Oct. 10-14, 2011, Jeju Island, South Korea, 8 pages.

"Small data fast path", SA WG2 Meeting #94, S2-124248, Ericsson, ST-Ericsson, Nov. 12-16, 2012, New Orleans, LA, USA, 7 pages.

* cited by examiner

DATA TRANSMISSION METHOD, APPARATUS AND SYSTEM

CROSS-REFERENCE TO RELATED APPLICATIONS

This application is a continuation of International Application No. PCT/CN2013/075908, filed on May 20, 2013, which is hereby incorporated by reference in its entirety.

TECHNICAL FIELD

Embodiments of present invention relate to the field of communications, and in particular, to a data transmission method, apparatus and system.

BACKGROUND

An existing evolved packet system (EPS) includes user equipment (UE), an evolved universal terrestrial radio access network (EUTRAN), and a core network (CN). Refer to a schematic architectural diagram of an EPS shown in FIG. 1. The EUTRAN may be specifically implemented by evolved node B (eNB); the CN mainly includes an mobility management entity (MME), an serving general packet radio service supporting node (SGSN), an home subscriber server (HSS), an serving gateway (S-GW), a packet data network gateway (P-GW), and a policy and charging rules function (PCRF).

When the user equipment attaches to the network, a bearer is established by using signaling exchange between a radio access network element, a mobility management network element, the serving gateway, and the packet data gateway, so as to transmit data by using the bearer. Because the existing EPS system is based on an IP mechanism, when the EPS system is used to send data, the radio access network element encapsulates an IP data packet into a general packet radio service tunnelling protocol for the user plane (GTP-U) data packet and then sends the GTP-U data packet to the serving gateway; the serving gateway sends the GTP-U data packet to the packet data gateway; and the packet data gateway decapsulates the GTP-U data packet into an IP data packet and then performs forwarding processing. Correspondingly, when the EPS system is used to receive data, after receiving an IP data packet, the packet data gateway encapsulates the IP data packet into a GTP-U data packet and then sends the GTP-U data packet to the serving gateway; the serving gateway forwards the GTP-U data packet to the radio access network element; and the radio access network element decapsulates the GTP-U data packet into an IP data packet and then sends the IP data packet to the user equipment.

An IP header needs to be added when data is encapsulated into an IP data packet. If UE only needs to transmit small data of an extremely small data volume, where, for example, the small data is a message generated by an application program, including a status message, a location message, a heartbeat message, a real-time message, and the like, or the small data is SIP (Session Initiation Protocol, Session Initiation Protocol) signaling, a Push (push) message, a control message, and the like, adding an IP header in front of the small data will decrease a data payload of an IP data packet, which decreases data transmission efficiency. For example, if the small data is 10 bytes, while a fixed size of the IP header is 20 bytes, the percentage of the small data is low in the IP packet, which decreases the data transmission efficiency.

SUMMARY

To solve a problem of low transmission efficiency of small data, embodiments of the present invention provide a data transmission method, apparatus, and system. The technical solutions are as follows:

According to a first aspect, an embodiment of the present invention provides a data transmission method, used in a gateway, where the method includes:
  detecting whether data transmitted in a received general packet radio service tunnelling protocol for the user plane GTP-U data packet is data of a predetermined type;
  if a result of the detection is that data transmitted in the GTP-U data packet is data of a predetermined type, decapsulating the GTP-U data packet, to obtain the data of the predetermined type and a destination address of the data of the predetermined type; and
  sending the data of the predetermined type and the destination address to a message gateway, so that the message gateway forwards the data of the predetermined type according to the destination address.

In a first possible implementation manner of the first aspect, the detecting whether data transmitted in a received general packet radio service tunnelling protocol for the user plane GTP-U data packet is data of a predetermined type includes:
  acquiring a message type in a header of the GTP-U data packet;
  detecting whether the message type is a predetermined message type; and
  if a result of the detection is that the message type is a predetermined message type, determining that the data transmitted in the received GTP-U data packet is the data of the predetermined type.

With reference to the first possible implementation manner of the first aspect, in a second possible implementation manner of the first aspect, if the gateway is a packet data gateway, the message type is set in advance by a radio access network element or by a serving gateway that is located between the radio access network element and the packet data gateway; or
  if the gateway is a serving gateway, the message type is set in advance by a radio access network element.

In a third possible implementation manner of the first aspect, the detecting whether data transmitted in a received general packet radio service tunnelling protocol for the user plane GTP-U data packet is data of a predetermined type includes:
  acquiring an identity of a bearer bearing the GTP-U data packet;
  detecting whether the bearer identity is a predetermined bearer identity; and
  if a result of the detection is that the bearer identity is a predetermined bearer identity, determining that the data transmitted in the received GTP-U data packet is the data of the predetermined type.

With reference to the third possible implementation manner of the first aspect, in a fourth possible implementation manner of the first aspect, before the detecting whether the bearer identity is a predetermined bearer identity, the method further includes:
  if the gateway is a packet data gateway, receiving the predetermined bearer identity that is from a mobility management network element and forwarded by a serving gateway, where the serving gateway is located between the mobility management network element and the packet data gateway; or if the gateway is a serving gateway, receiving the predetermined bearer identity sent by a mobility management network element.

In a fifth possible implementation manner of the first aspect, if the gateway is a serving gateway, the detecting whether data transmitted in a received general packet radio service tunnelling protocol for the user plane GTP-U data packet is data of a predetermined type includes:

detecting whether the GTP-U data packet carries a tunnel endpoint identifier of a radio access network element; and if a result of the detection is that the GTP-U data packet carries a tunnel endpoint identifier of a radio access network element, determining that the data transmitted in the received GTP-U data packet is the data of the predetermined type.

According to a second aspect, an embodiment of the present invention provides a data transmission method, used in a message gateway, where the method includes:

receiving data of a predetermined type and a destination address of the data of the predetermined type that are sent by a gateway, where the data of the predetermined type and the destination address are obtained by the gateway by detecting whether data transmitted in a received general packet radio service tunnelling protocol for the user plane GTP-U data packet is the data of the predetermined type, and by decapsulating the GTP-U data packet if a result of the detection is that the data transmitted in the GTP-U data packet is the data of the predetermined type; and forwarding the data of the predetermined type according to the destination address.

According to a third aspect, an embodiment of the present invention provides a data transmission method, used in a gateway, where the method includes:

receiving data of a predetermined type and a destination address of the data of the predetermined type that are sent by a message gateway; and forwarding a general packet radio service tunnelling protocol for the user plane GTP-U data packet, where the GTP-U data packet is obtained by encapsulating the data of the predetermined type and the destination address.

In a first possible implementation manner of the third aspect, if the gateway is a serving gateway, before the forwarding a general packet radio service tunnelling protocol for the user plane GTP-U data packet, the method further includes:

sending, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

With reference to the first possible implementation manner of the third aspect, in a second possible implementation manner of the third aspect, the receiving data of a predetermined type and a destination address of the data of the predetermined type that are sent by a message gateway includes:

receiving the data of the predetermined type and the destination address that are from the message gateway and forwarded by a packet data gateway, where the packet data gateway is located between the serving gateway and the message gateway.

In a third possible implementation manner of the third aspect, if the gateway is a packet data gateway, the forwarding a general packet radio service tunnelling protocol for the user plane GTP-U data packet includes:

forwarding the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, where the serving gateway is located between the mobility management network element and the packet data gateway.

According to a fourth aspect, an embodiment of the present invention provides a data transmission method, used in a message gateway, where the method includes:

receiving data of a predetermined type and a destination address of the data of the predetermined type; and sending the data of the predetermined type and the destination address to a gateway, so that the gateway receives the data of the predetermined type and the destination address that are sent by the message gateway, and forwards a general packet radio service tunnelling protocol for the user plane GTP-U data packet, where the GTP-U data packet is obtained by encapsulating the data of the predetermined type and the destination address.

According to a fifth aspect, an embodiment of the present invention provides a gateway, where the gateway includes:

a detection module, configured to detect whether data transmitted in a received general packet radio service tunnelling protocol for the user plane GTP-U data packet is data of a predetermined type;

a decapsulation module, configured to: if a result of the detection by the detection module is that data transmitted in the GTP-U data packet is data of a predetermined type, decapsulate the GTP-U data packet, to obtain the data of the predetermined type and a destination address of the data of the predetermined type; and a sending module, configured to send, to a message gateway, the data of the predetermined type and the destination address that are obtained through decapsulation by the decapsulation module, so that the message gateway forwards the data of the predetermined type according to the destination address.

In a first possible implementation manner of the fifth aspect, the detection module includes:
 a first acquiring unit, configured to acquire a message type in a header of the GTP-U data packet;
 a first detection unit, configured to detect whether the message type acquired by the first acquiring unit is a predetermined message type; and
 a first determining unit, configured to: if a result of the detection by the first detection unit is that the message type is a predetermined message type, determine that the data transmitted in the received GTP-U data packet is the data of the predetermined type.

With reference to the first possible implementation manner of the fifth aspect, in a second possible implementation manner of the fifth aspect, if the gateway is a packet data gateway, the message type is set in advance by a radio access network element or by a serving gateway that is located between the radio access network element and the packet data gateway; or
 if the gateway is a serving gateway, the message type is set in advance by a radio access network element.

In a third possible implementation manner of the fifth aspect, the detection module includes:
 a second acquiring unit, configured to acquire an identity of a bearer bearing the GTP-U data packet;
 a second detection unit, configured to detect whether the bearer identity acquired by the second acquiring unit is a predetermined bearer identity; and
 a second determining unit, configured to: if a result of the detection by the second detection unit is that the bearer identity is a predetermined bearer identity, determine that the data transmitted in the received GTP-U data packet is the data of the predetermined type.

With reference to the third possible implementation manner of the fifth aspect, in a fourth possible implementation manner of the fifth aspect, the detection module further includes:
 a first receiving unit, configured to: before the second detection unit detects whether the bearer identity is a predetermined bearer identity, if the gateway is a packet data gateway, receive the predetermined bearer identity that is from a mobility management network element and forwarded by a serving gateway, where the serving gateway is located between the mobility management network element and the packet data gateway; and
 a second receiving unit, configured to: before the second detection unit detects whether the bearer identity is a predetermined bearer identity, if the gateway is a serving gateway, receive the predetermined bearer identity sent by a mobility management network element.

In a fifth possible implementation manner of the fifth aspect, if the gateway is a serving gateway, the detection module includes:
 a third detection unit, configured to detect whether the GTP-U data packet carries a tunnel endpoint identifier of a radio access network element; and
 a third determining unit, configured to: if a result of the detection by the third detection unit is that the GTP-U data packet carries a tunnel endpoint identifier of a radio access network element, determine that the data transmitted in the received GTP-U data packet is the data of the predetermined type.

According to a sixth aspect, an embodiment of the present invention provides a message gateway, where the message gateway includes:
 a receiving module, configured to receive data of a predetermined type and a destination address of the data of the predetermined type that are sent by a gateway, where the data of the predetermined type and the destination address are obtained by the gateway by detecting whether data transmitted in a received general packet radio service tunnelling protocol for the user plane GTP-U data packet is the data of the predetermined type, and by decapsulating the GTP-U data packet if a result of the detection is that the data transmitted in the GTP-U data packet is the data of the predetermined type; and
 a forwarding module, configured to forward the data of the predetermined type according to the destination address received by the receiving module.

According to a seventh aspect, an embodiment of the present invention provides a gateway, where the gateway includes:
 a first receiving module, configured to receive data of a predetermined type and a destination address of the data of the predetermined type that are sent by a message gateway; and
 a first forwarding module, configured to forward a general packet radio service tunnelling protocol for the user plane GTP-U data packet, where the GTP-U data packet is obtained by encapsulating the data of the predetermined type and the destination address.

In a first possible implementation manner of the seventh aspect, if the gateway is a serving gateway, the detection module further includes:
 a second forwarding module, configured to: before the first forwarding module forwards the general packet radio service tunnelling protocol for the user plane GTP-U data packet, send, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

With reference to the first possible implementation manner of the seventh aspect, in a second possible implementation manner of the seventh aspect, the first receiving module is configured to receive the data of the predetermined type and the destination address that are from the message gateway and forwarded by a packet data gateway, where the packet data gateway is located between the serving gateway and the message gateway.

In a third possible implementation manner of the third aspect, if the gateway is a packet data gateway, the first forwarding module is configured to forward the data of the predetermined type, the destination address, and a predetermined data indication to the serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, where the serving gateway is located between the mobility management network element and the packet data gateway.

According to an eighth aspect, an embodiment of the present invention provides a message gateway, where the message gateway includes:

a second receiving module, configured to receive data of a predetermined type and a destination address of the data of the predetermined type; and a sending module, configured to send the data of the predetermined type and the destination address to a gateway, so that the gateway receives the data of the predetermined type and the destination address that are sent by the message gateway, and forwards a general packet radio service tunnelling protocol for the user plane GTP-U data packet, where the GTP-U data packet is obtained by encapsulating the data of the predetermined type and the destination address.

According to a ninth aspect, an embodiment of the present invention provides a gateway, where the gateway includes:

a first processor, configured to detect whether data transmitted in a received general packet radio service tunnelling protocol for the user plane GTP-U data packet is data of a predetermined type; and if a result of the detection is that data transmitted in the GTP-U data packet is data of a predetermined type, decapsulate the GTP-U data packet, to obtain the data of the predetermined type and a destination address of the data of the predetermined type; and a first transmitter, configured to send, to a message gateway, the data of the predetermined type and the destination address that are obtained through decapsulation by the first processor, so that the message gateway forwards the data of the predetermined type according to the destination address.

In a first possible implementation manner of the ninth aspect, the first processor is configured to obtain a message type in a header of the GTP-U data packet; detect whether the message type is a predetermined message type; and if a result of the detection is that the message type is a predetermined message type, determine that the data transmitted in the received GTP-U data packet is the data of the predetermined type.

With reference to the first possible implementation manner of the ninth aspect, in a second possible implementation manner of the ninth aspect, if the gateway is a packet data gateway, the message type is set in advance by a radio access network element or by a serving gateway that is located between the radio access network element and the packet data gateway; or if the gateway is a serving gateway, the message type is set in advance by a radio access network element.

In a third possible implementation manner of the ninth aspect, the first processor is configured to obtain an identity of a bearer bearing the GTP-U data packet; detect whether the bearer identity is a predetermined bearer identity; and if a result of the detection is that the bearer identity is a predetermined bearer identity, determine that the data transmitted in the received GTP-U data packet is the data of the predetermined type.

With reference to the third possible implementation manner of the ninth aspect, in a fourth possible implementation manner of the ninth aspect, the gateway further includes:

a first receiver, configured to: before the first processor detects whether the bearer identity is a predetermined bearer identity, if the gateway is a packet data gateway, receive the predetermined bearer identity that is from a mobility management network element and forwarded by a serving gateway, where the serving gateway is located between the mobility management network element and the packet data gateway; or if the gateway is a serving gateway, receive the predetermined bearer identity sent by a mobility management network element.

In a fifth possible implementation manner of the ninth aspect, the first processor is further configured to: if the gateway is a serving gateway, detect whether the GTP-U data packet carries a tunnel endpoint identifier of a radio access network element; and if a result of the detection is that the GTP-U data packet carries a tunnel endpoint identifier of a radio access network element, determine that data transmitted in the GTP-U data packet is data of a predetermined type.

According to a tenth aspect, an embodiment of the present invention provides a message gateway, where the message gateway includes:

a second receiver, configured to receive data of a predetermined type and a destination address of the data of the predetermined type that are sent by a gateway, where the data of the predetermined type and the destination address are obtained by the gateway by detecting whether data transmitted in a received general packet radio service tunnelling protocol for the user plane GTP-U data packet is the data of the predetermined type, and by decapsulating the GTP-U data packet if a result of the detection is that the data transmitted in the GTP-U data packet is the data of the predetermined type;

a second processor, configured to control a second transmitter to forward the data of the predetermined type according to the destination address received by the second receiver; and the second transmitter, configured to forward, under the control of the second processor, the data of the predetermined type according to the destination address received by the second receiver.

According to an eleventh aspect, an embodiment of the present invention provides a gateway, where the gateway includes:

a first receiver, configured to receive data of a predetermined type and a destination address of the data of the predetermined type that are sent by a message gateway;

a first processor, configured to control a first transmitter to forward a general packet radio service tunnelling protocol for the user plane GTP-U data packet, where the GTP-U data packet is obtained by encapsulating the data of the predetermined type and the destination address that are received by the first receiver; and the first transmitter, configured to forward the GTP-U data packet under the control of the first processor.

In a first possible implementation manner of the eleventh aspect, if the gateway is a serving gateway, the first transmitter is configured to: before forwarding the general packet radio service tunnelling protocol for the user plane GTP-U data packet, send, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

With reference to the first possible implementation manner of the eleventh aspect, in a second possible implementation manner of the eleventh aspect, the first receiver is configured to receive the data of the predetermined type and the destination address that are from the message gateway and forwarded by a packet data gateway, where the packet data gateway is located between the serving gateway and the message gateway.

In a third possible implementation manner of the eleventh aspect, if the gateway is a packet data gateway, the first transmitter is configured to forward the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, where the serving gateway is located between the mobility management network element and the packet data gateway.

According to a twelfth aspect, an embodiment of the present invention provides a message gateway, where the message gateway includes:

a second receiver, configured to receive data of a predetermined type and a destination address of the data of the predetermined type;

a second processor, configured to control a second transmitter to send, to a gateway, the data of the predetermined type and the destination address that are received by the second receiver; and the second transmitter, configured to send, under the control of the second processor, the data of the predetermined type and the destination address that are received by the second receiver to the gateway, so that the gateway receives the data of the predetermined type and the destination address that are sent by the message gateway, and forwards a general packet radio service tunnelling protocol for the user plane GTP-U data packet, where the GTP-U data packet is obtained by encapsulating the data of the predetermined type and the destination address.

According to a thirteenth aspect, an embodiment of the present invention provides a data transmission system, where the system includes:

the gateway according to the fifth aspect and the message gateway according to the sixth aspect; or the gateway according to the seventh aspect and the message gateway according to the eighth aspect.

According to a fourteenth aspect, an embodiment of the present invention provides a data transmission system, where the system includes:

the gateway according to the ninth aspect and the message gateway according to the tenth aspect; or the gateway according to the eleventh aspect and the message gateway according to the twelfth aspect.

The technical solutions provided by the embodiments of the present invention have the following beneficial effects:

It is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
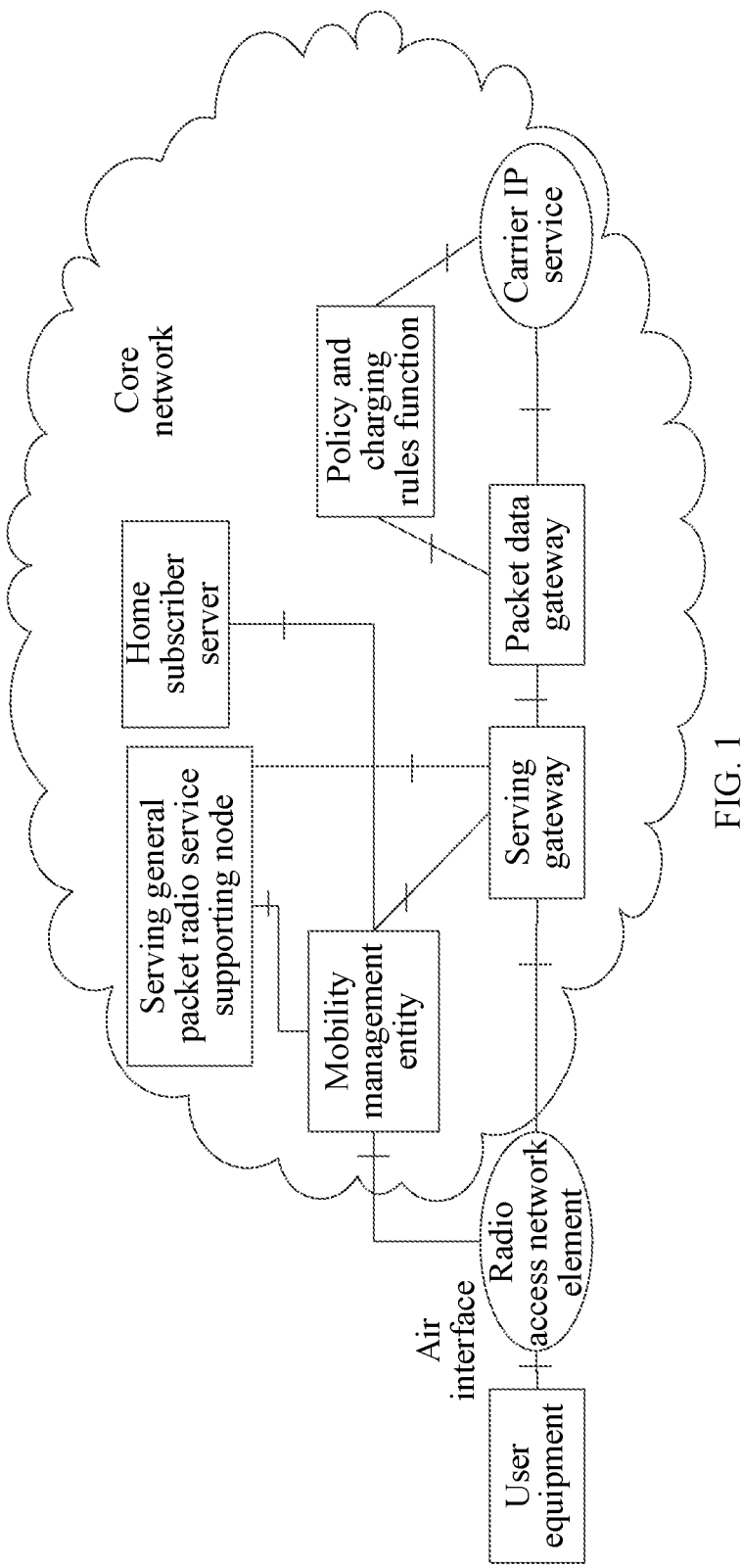
FIG. 1 is a schematic architectural diagram of an EPS provided in the prior art.
Figure 2:
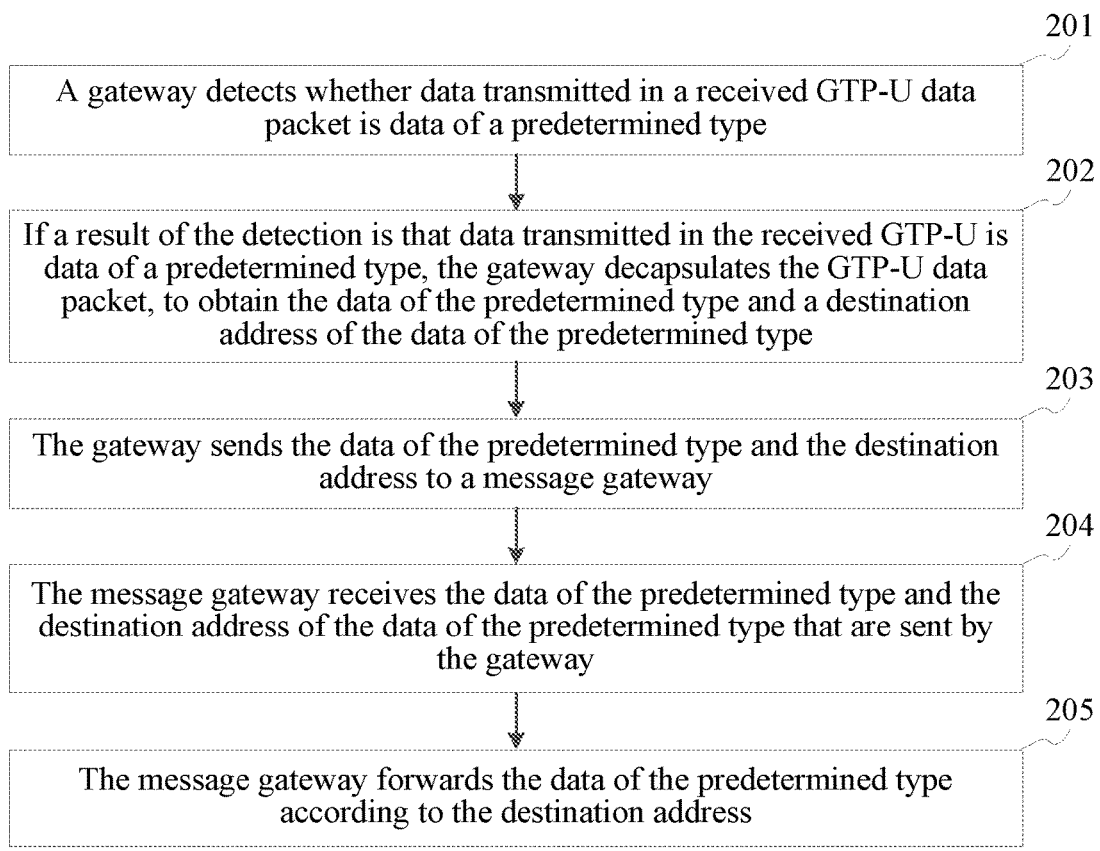
FIG. 2 is a method flowchart of a data transmission method according to Embodiment 1 of the present invention.

Referring to FIG. 2, FIG. 2 shows a method flowchart of a data transmission method according to Embodiment 1 of the present invention. The data transmission method is an uplink data sending method, and may be applied in an EPS. The data transmission method may include:

Step 201: A gateway detects whether data transmitted in a received GTP-U data packet is data of a predetermined type, and if a result of the detection is that data transmitted in the GTP-U data packet is data of a predetermined type, perform step 202.

The GTP-U data packet is obtained by performing GTP-U protocol encapsulation on data received on an air interface. If an IP data packet is received on the air interface, the IP data packet may be encapsulated into a GTP-U data packet for transmission. If data of a predetermined type of a non-IP data packet is received on the air interface, the data of the predetermined type may be directly encapsulated into a GTP-U data packet for transmission, which avoids a problem of decreasing data transmission efficiency caused by adding an IP header in front of the data of the predetermined type. The data of the predetermined type may be small data, or may be data of another type, which is not limited in this embodiment. The small data may be a message generated by an application program, including a status message, a location message, a heartbeat message, a real-time message, and the like; or may be SIP signaling, a Push message, a control message, and the like.

Because data transmitted in the GTP-U data packet may be data of a predetermined type of a non-IP data packet, or may be an IP data packet, after receiving the GTP-U data packet, the gateway needs to determine whether data transmitted in the GTP-U data packet is data of a predetermined type, and if a result of the detection is that data transmitted in the GTP-U data packet is data of a predetermined type, step 202 is performed; or if a result of the detection is that data transmitted in the GTP-U data packet is not data of a predetermined type, the GTP-U data packet is processed according to an existing EPS procedure, which is not described in detail in this embodiment.

Step 202: The gateway decapsulates the GTP-U data packet, to obtain the data of the predetermined type and a destination address of the data of the predetermined type.

Because the gateway detects that data transmitted in the GTP-U data packet is data of a predetermined type, the gateway may decapsulate the GTP-U data packet, to obtain the data of the predetermined type. Preferably, the destination address of the data of the predetermined type may also be encapsulated along with the data of the predetermined type, so that the gateway can send the data of the predetermined type according to the destination address after decapsulating the GTP-U data packet.

Step 203: The gateway sends the data of the predetermined type and the destination address to a message gateway.

The message gateway may be a newly added gateway in the EPS, where the message gateway supports a newly defined transmission protocol that is based on data of a predetermined type, and the gateway may send the data of the predetermined type and the destination address to the message gateway by using the transmission protocol.

Step 204: The message gateway receives the data of the predetermined type and the destination address of the data of the predetermined type that are sent by the gateway.

Based on the newly defined transmission protocol for data of a predetermined type, the message gateway can receive the data of the predetermined type and the destination address that are sent by the gateway.

Step 205: The message gateway forwards the data of the predetermined type according to the destination address.

Figure 3:
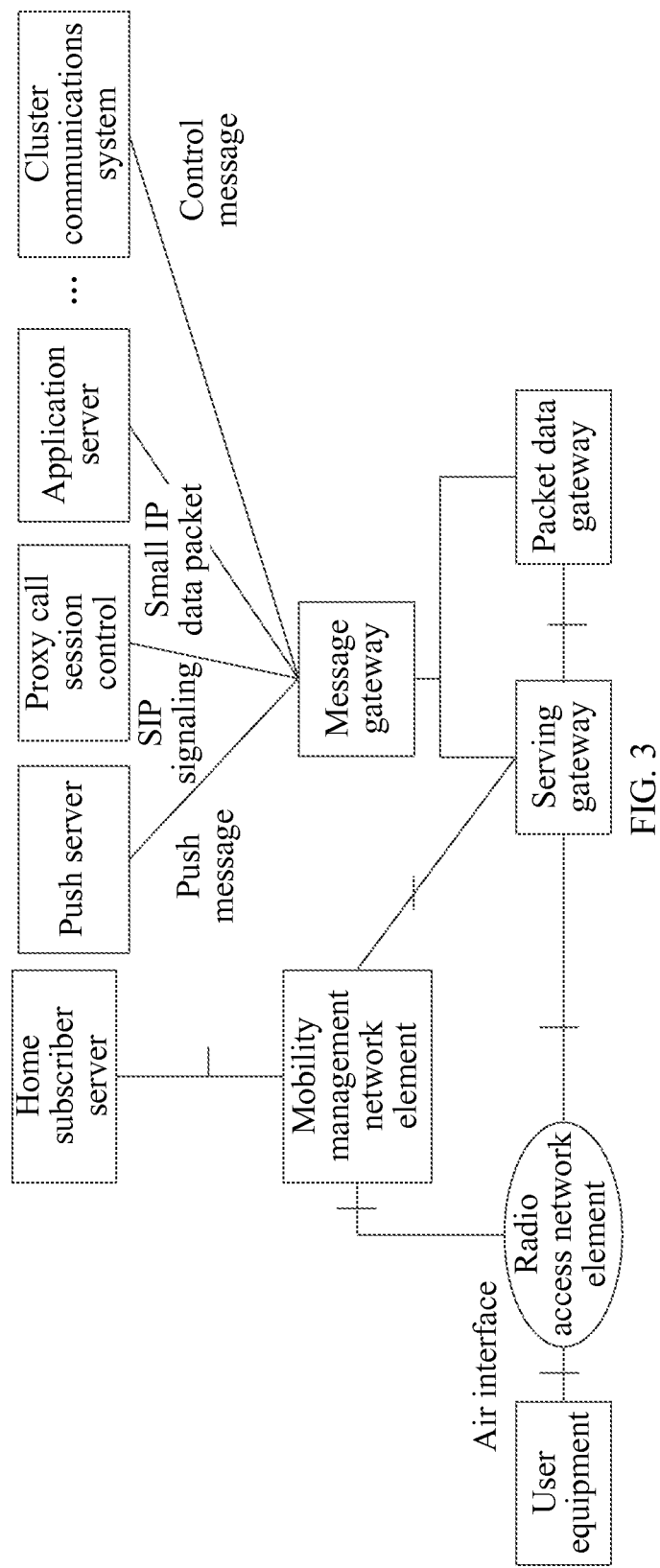
FIG. 3 is a schematic diagram of an application of a data transmission system according to Embodiment 1 of the present invention.

The message gateway may be connected to a Push server, a P-CSCF (Proxy Call Session Control Function, proxy call session control), an application server, a cluster communications system, and the like; refer to a schematic diagram of an application of a data transmission system shown in FIG. 3. Therefore, the message gateway may determine, according to the received destination address, a server or system corresponding to the data of the predetermined type, thereby forwarding the data of the predetermined type to the server or system. The Push server is used to transmit a Push message, the P-CSCF is used to transmit SIP signaling, the application server is used to transmit a small data packet, and the cluster system is used to transmit a control message.

In conclusion, in the data transmission method provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved.

Embodiment 2

Figure 4:
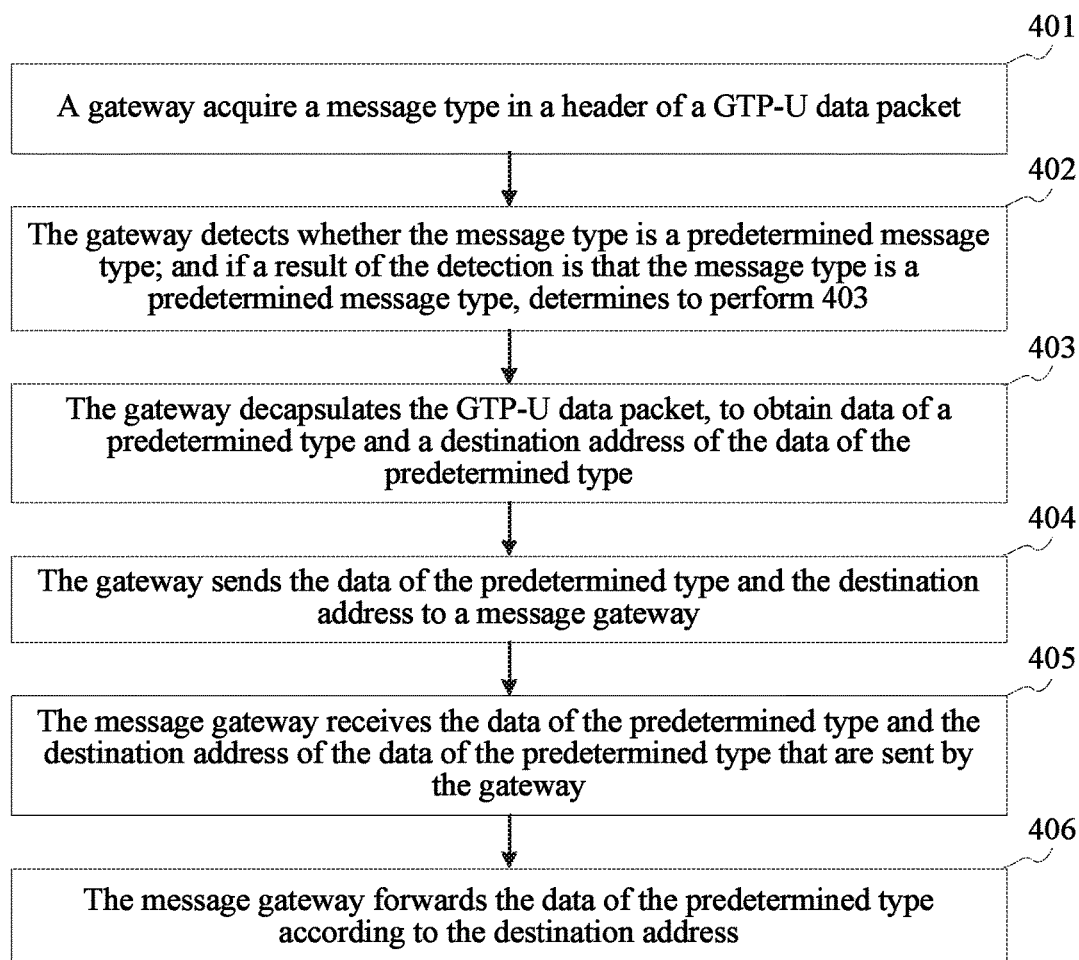
FIG. 4 is a method flowchart of a data transmission method according to Embodiment 2 of the present invention.

Referring to FIG. 4, FIG. 4 shows a method flowchart of a data transmission method according to Embodiment 2 of the present invention. The data transmission method is an uplink data sending method, and may be applied in an EPS. The data transmission method may include:

Step 401: Acquire a message type in a header of a GTP-U data packet.

The GTP-U data packet is obtained by performing GTP-U protocol encapsulation on data received on an air interface. If an IP data packet is received on the air interface, the IP data packet may be encapsulated into a GTP-U data packet for transmission. If data of a predetermined type of a non-IP data packet is received on the air interface, the data of the predetermined type may be directly encapsulated into a GTP-U data packet for transmission, which avoids a problem of decreasing data transmission efficiency caused by adding an IP header in front of the data of the predetermined type. The data of the predetermined type may be small data, or may be data of another type, which is not limited in this embodiment. The small data may be a message generated by an application program, including a status message, a location message, a heartbeat message, a real-time message, and the like; or may be SIP signaling, a Push message, a control message, and the like.

Before the GTP-U data packet is obtained through encapsulation, because the GTP-U data packet is obtained through encapsulation performed by a radio access network element, if data transmitted in the GTP-U data packet is data of a predetermined type, before obtaining the GTP-U data packet through encapsulation, the radio access network element first needs to receive data of a predetermined type sent by user equipment. Specifically, the user equipment may detect a data type of data, if a result of the detection is that the data is data of a predetermined type, the user equipment sends the data of the predetermined type to the radio access network element by using an optimized air interface message, where the optimized air interface message is an improvement based on an existing message, and is not described in detail in this embodiment of the present invention; or if a result of the detection is that the data is not data of a predetermined type, the user equipment sends the data to the radio access network element through an existing IP transmission path. Specifically, the UE may detect whether the data is data of a predetermined type according to a volume of the data, an amount of the data, or a data type specified by an application program, and this embodiment does not limit the method for detecting data of a predetermined type.

Preferably, the destination address of the data of the predetermined type may be encapsulated along with the data of the predetermined type, so that the gateway can send the data of the predetermined type according to the destination address after decapsulating the GTP-U data packet.

During encapsulation of the GTP-U data packet, because data transmitted in the GTP-U data packet may be data of a predetermined type of a non-IP data packet or may be an IP data packet, to distinguish data transmitted in the GTP-U data packet, further, the message type in the header of the GTP-U data packet may be set in advance. For example, a numerical value of the message type (Message Type) in the header of the GTP-U data packet may be set, to identify that data transmitted in the GTP-U data packet is data of a predetermined type. Specifically, 256 numerical values are defined for the message type in the header of the GTP-U data packet; in this case, a random numerical value, such as 00000001, may be selected from the 256 numerical values, and if data transmitted in the GTP-U data packet is data of a predetermined type, the message type in the header of the GTP-U data packet is set to 00000001, to identify that data transmitted in the GTP-U data packet is data of a predetermined type.

It should be noted additionally that, if the gateway in this embodiment is a packet data gateway, the message type may be set in advance by a radio access network element or by a serving gateway that is located between the radio access network element and the packet data gateway; or if the gateway in this embodiment is a serving gateway, the message type is set by a radio access network element in advance.

If the message type is set by the radio access network element, no matter the gateway is a serving gateway or a packet data gateway, it can be determined, according to the message type, that data transmitted in the GTP-U data packet is data of a predetermined type. If the gateway is a packet data gateway and the radio access network element does not set the message type, the serving gateway may detect, according to a tunnel endpoint identifier of the radio access network element, whether data transmitted in the GTP-U data packet is data of a predetermined type, and if a result of the detection is that data transmitted in the GTP-U data packet is data of a predetermined type, the message type in the header of the GTP-U data packet may be set, so that the packet data gateway can determine, according to the set message type, whether data transmitted in the GTP-U data packet is data of a predetermined type. For details of a method for setting the message type, refer to the foregoing description, and details are not described herein again.

Specifically, if the gateway is a serving gateway, the detecting whether data transmitted in a received GTP-U data packet is data of a predetermined type may include:

detecting whether the GTP-U data packet carries a tunnel endpoint identifier of a radio access network element; and if a result of the detection is that the GTP-U data packet carries a tunnel endpoint identifier of a radio access network element, determining that the data transmitted in the received GTP-U data packet is the data of the predetermined type.

The tunnel endpoint identifier of the radio access network element is used for establishing a bearer with a serving gateway, and may be carried in the GTP-U data packet and sent to the serving gateway.

After the GTP-U data packet is obtained through encapsulation, the radio access network element may send the GTP-U data packet to the serving gateway; if the gateway in this embodiment is the serving gateway, the serving gateway may process the received GTP-U data packet; or if the gateway in this embodiment is a packet data gateway, the serving gateway forwards the GTP-U data packet to the packet data gateway after receiving the GTP-U data packet, and the GTP-U data packet is processed by the data packet gateway.

Specifically, when the radio access network element sends the GTP-U data packet to the serving gateway, for the purpose of being distinguished from an existing method that a transmission channel between the gateway and the radio access network element is established in advance by using a service request Service Request message and then data is transmitted through the transmission channel, a tunnel endpoint identifier of the serving gateway may be sent to the user equipment in an attach procedure, to avoid a problem of increasing signaling overheads caused by that the user equipment establishes or recovers a user plane bearer on an air interface side. The user equipment sends the tunnel endpoint identifier of the serving gateway along with the data to the radio access network element; the radio access network element establishes a bearer with the serving gateway according to the tunnel endpoint identifier, and sends the tunnel endpoint identifier of the radio access network element to the serving gateway, so that the serving gateway saves the tunnel endpoint identifier of the radio access network element in context information, thereby transmitting the GTP-U data packet through the established bearer. The tunnel endpoint identifier of the serving gateway may be provided for the user equipment by a network side in a session management process such as bearer establishment or modification. Preferably, the tunnel endpoint identifier of the serving gateway may be specifically an S1-U F-TEID (S1-User Fully Qualified Tunnel Endpoint Identifier, S1-user fully qualified tunnel end point identifier) of the serving gateway; and the tunnel endpoint identifier of the radio access network element may be specifically an S1-U F-TEID of the radio access network element, which is not specifically limited in this embodiment.

After receiving the GTP-U data packet, the gateway may perform decryption and integrity verification on the GTP-U data packet, read the numerical value of the message type in the header of the GTP-U data packet, and continue to perform step 402.

Step 402: The gateway detects whether the message type is a predetermined message type; and if a result of the detection is that the message type is a predetermined message type, determines to perform step 403.

The gateway may set a predetermined numerical value of the predetermined message type in advance, for example, 256 values are defined for the message type (Message Type) in the header of the GTP-U data packet, one numerical value may be randomly selected as the predetermined numerical value, and the numerical value of the message type acquired in step 401 may be compared with the predetermined numerical value. If a result of the comparison is that the numerical value is the same as the predetermined numerical value, it is determined that data transmitted in the GTP-U data packet is data of a predetermined type, and step 403 is performed; or if a result of the comparison is that the numerical value is different from the predetermined numerical value, it is determined that data transmitted in the GTP-U data packet is not data of a predetermined type, and the GTP-U data packet is processed according to an existing EPS procedure, which is not described in detail in this embodiment.

Step 403: The gateway decapsulates the GTP-U data packet, to obtain data of a predetermined type and a destination address of the data of the predetermined type.

Because the gateway detects that data transmitted in the GTP-U data packet is data of a predetermined type, the gateway may decapsulate the GTP-U data packet, to obtain the data of the predetermined type and the destination address. The destination address is a device that finally receives the data of the predetermined type, for example, a server or a system, which is not limited in this embodiment.

Step 404: The gateway sends the data of the predetermined type and the destination address to a message gateway.

The message gateway may be a newly added gateway in the EPS, where the message gateway supports a newly defined transmission protocol that is based on data of a predetermined type, and the gateway may send the data of the predetermined type and the destination address to the message gateway by using the transmission protocol. The newly defined transmission protocol for data of a predetermined type may be a Message-AP (Message-Access Point, message-access point) protocol, or the like, which is not limited in this embodiment.

Step 405: The message gateway receives the data of the predetermined type and the destination address of the data of the predetermined type that are sent by the gateway.

Based on the newly defined transmission protocol for data of a predetermined type, the message gateway can receive the data of the predetermined type and the destination address that are sent by the gateway.

Step 406: The message gateway forwards the data of the predetermined type according to the destination address.

Because the message gateway may be connected to a Push server, a P-CSCF, an application server, a cluster communications system, and the like, the message gateway may determine, according to the received destination address, a device corresponding to the data of the predetermined type, thereby forwarding the data of the predetermined type to the device. The Push server is used to transmit a Push message, the P-CSCF is used to transmit SIP signaling, the application server is used to transmit a small data packet, and the cluster system is used to transmit a control message.

Figure 5:
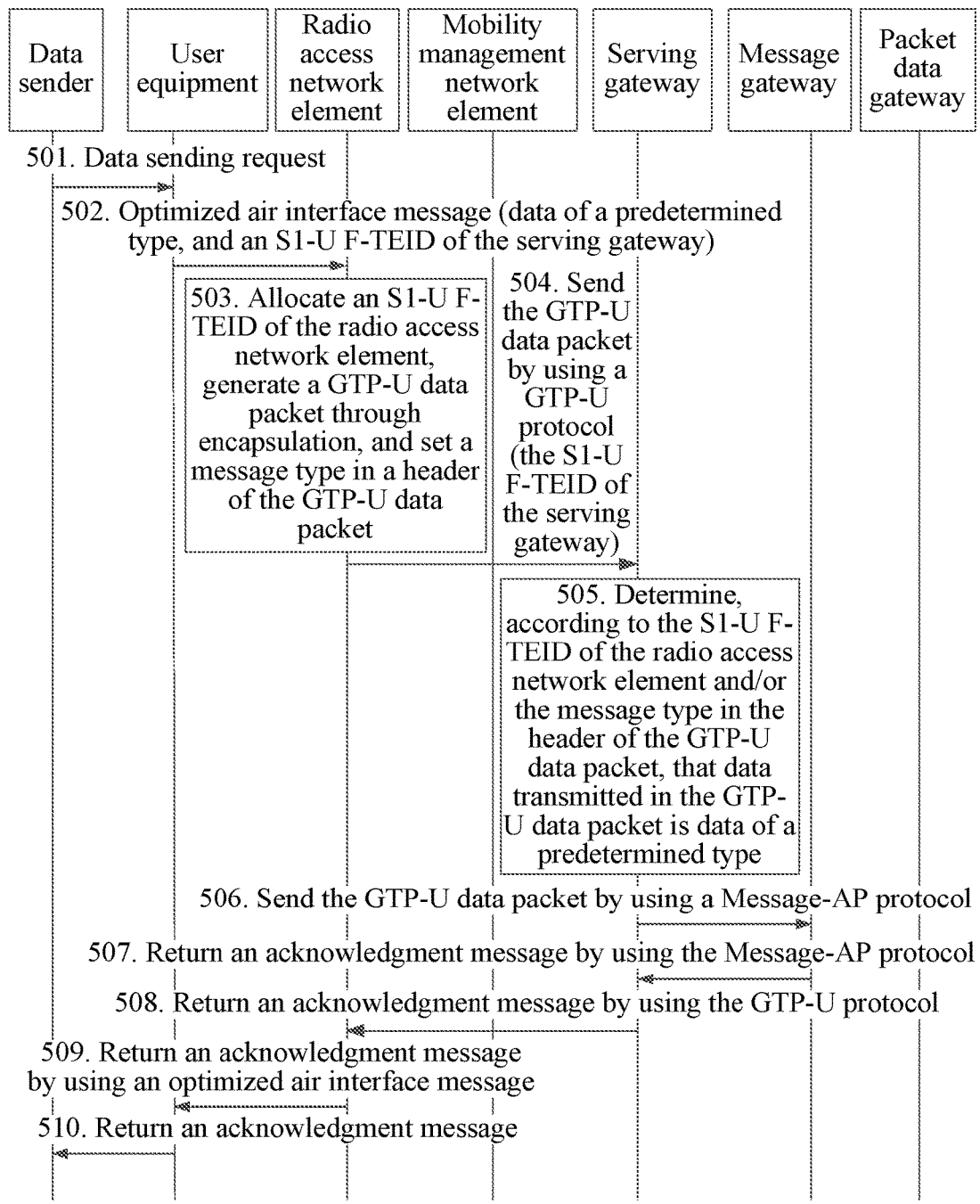
FIG. 5 is a schematic diagram of a first application of a data transmission system according to Embodiment 2 of the present invention.

Referring to FIG. 5, this embodiment further provides a schematic flowchart of a first specific application of the foregoing method, and a data transmission process is specifically as follows:

Step 501: A data sender initiates a data sending request to user equipment.

Step 502: The user equipment sends data of a predetermined type and an S1-U F-TEID of a serving gateway to a radio access network element by using an optimized air interface message.

Step 503: The radio access network element allocates a new S1-U F-TEID to the data of the predetermined type, where the new S1-U F-TEID is an S1-U F-TEID of the radio access network element, encapsulates the data of the predetermined type into a GTP-U data packet, and sets a message type in a header of the GTP-U data packet.

Step 504: The radio access network element sends the GTP-U data packet to the serving gateway by using the S1-U F-TEID of the serving gateway.

Step 505: The serving gateway determines, according to the S1-U F-TEID of the radio access network element carried in the GTP-U data packet and/or the message type in the header of the GTP-U data packet, that data transmitted in the GTP-U data packet is data of a predetermined type, and performs step 506.

Step 506: The serving gateway sends the GTP-U data packet to a message gateway by using a Message-AP protocol.

Step 507: The message gateway returns an acknowledgment message to the serving gateway by using the Message-AP protocol.

Step 508: The serving gateway returns an acknowledgment message to the radio access network element by using a GTP-U protocol.

Step 509: The radio access network element returns an acknowledgment message to the user equipment by using an optimized air interface message.

Step 510: The user equipment returns an acknowledgment message to the data sender.

Figure 6:
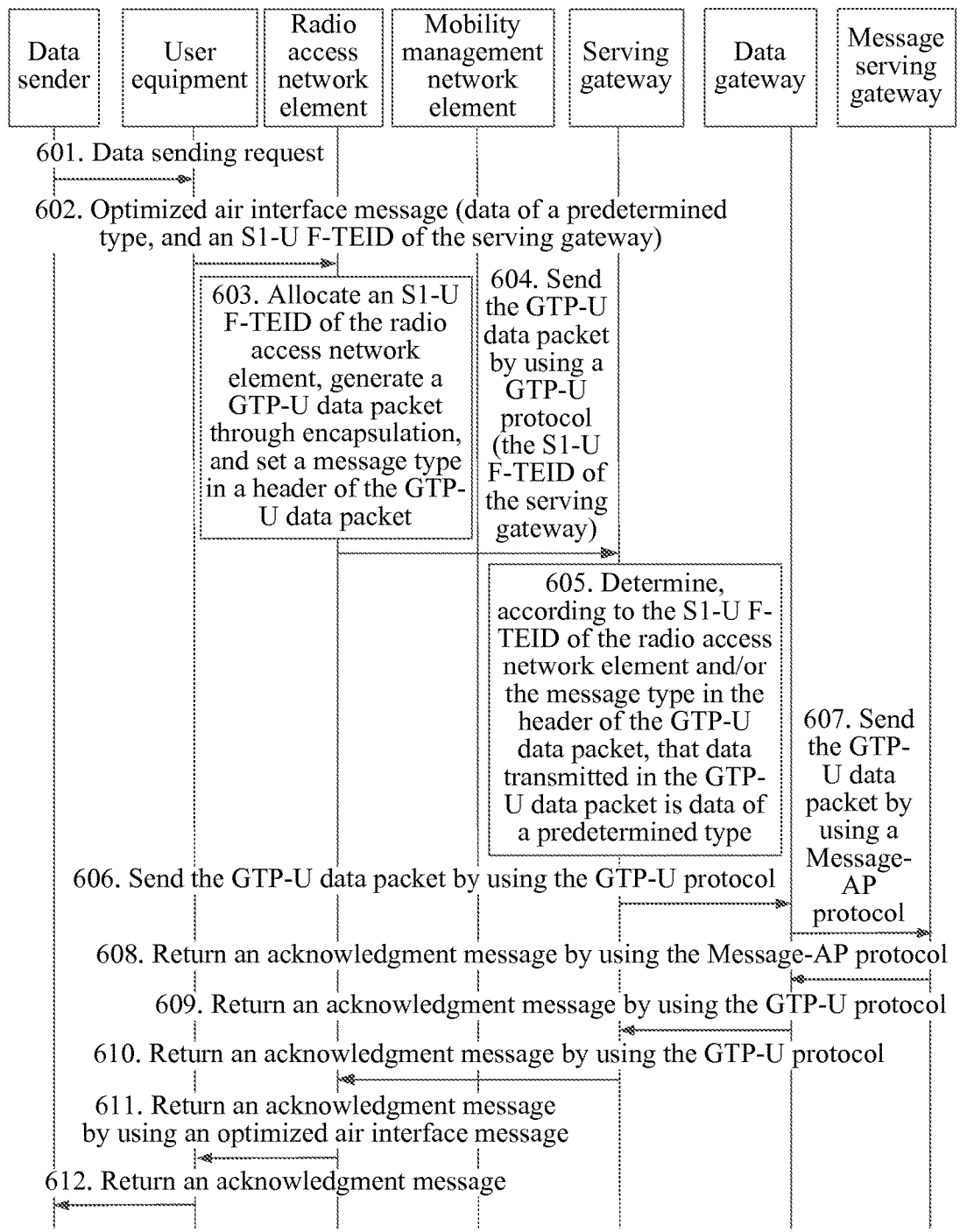
FIG. 6 is a schematic diagram of a second application of a data transmission system according to Embodiment 2 of the present invention.

Referring to FIG. 6, this embodiment further provides a schematic flowchart of a second specific application of the foregoing method, and a data transmission process is specifically as follows:

Step 601: A data sender initiates a data sending request to user equipment.

Step 602: The user equipment sends data of a predetermined type and an S1-U F-TEID of a serving gateway to a radio access network element by using an optimized air interface message.

Step 603: The radio access network element allocates a new S1-U F-TEID to the data of the predetermined type, where the new S1-U F-TEID is an S1-U F-TEID of the radio access network element, encapsulates the data of the predetermined type into a GTP-U data packet, and sets a message type in a header of the GTP-U data packet.

Step 604: The radio access network element sends the GTP-U data packet to the serving gateway by using the S1-U F-TEID of the serving gateway.

Step 605: The serving gateway determines, according to the S1-U F-TEID of the radio access network element carried in the GTP-U data packet and/or the message type in the header of the GTP-U data packet, that data transmitted in the GTP-U data packet is data of a predetermined type, and performs step 606.

Further, if the radio access network element does not set the message type in the header of the GTP-U data packet, the serving gateway needs to set the message type, so that a packet data gateway determines, according to the message type, that data transmitted in the GTP-U data packet is data of a predetermined type.

Step 606: The serving gateway sends the GTP-U data packet to a packet data gateway by using a GTP-U protocol.

Step 607: The packet data gateway sends the GTP-U data packet to a message gateway by using a Message-AP protocol.

Step 608: The message gateway returns an acknowledgment message to the packet data gateway by using the Message-AP protocol.

Step 609: The packet data gateway returns an acknowledgment message to the serving gateway by using the GTP-U protocol.

Step 610: The serving gateway returns an acknowledgment message to the radio access network element by using the GTP-U protocol.

Step 611: The radio access network element returns an acknowledgment message to the user equipment by using an optimized air interface message.

Step 612: The user equipment returns an acknowledgment message to the data sender.

In conclusion, in the data transmission method provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved. In addition, it is detected whether the GTP-U data packet carries a tunnel endpoint identifier of a radio access network element; and it is determined that the data transmitted in the received GTP-U data packet is the data of the predetermined type if a result of the detection is that the GTP-U data packet carries a tunnel endpoint identifier of a radio access network element, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 3

Figure 7:
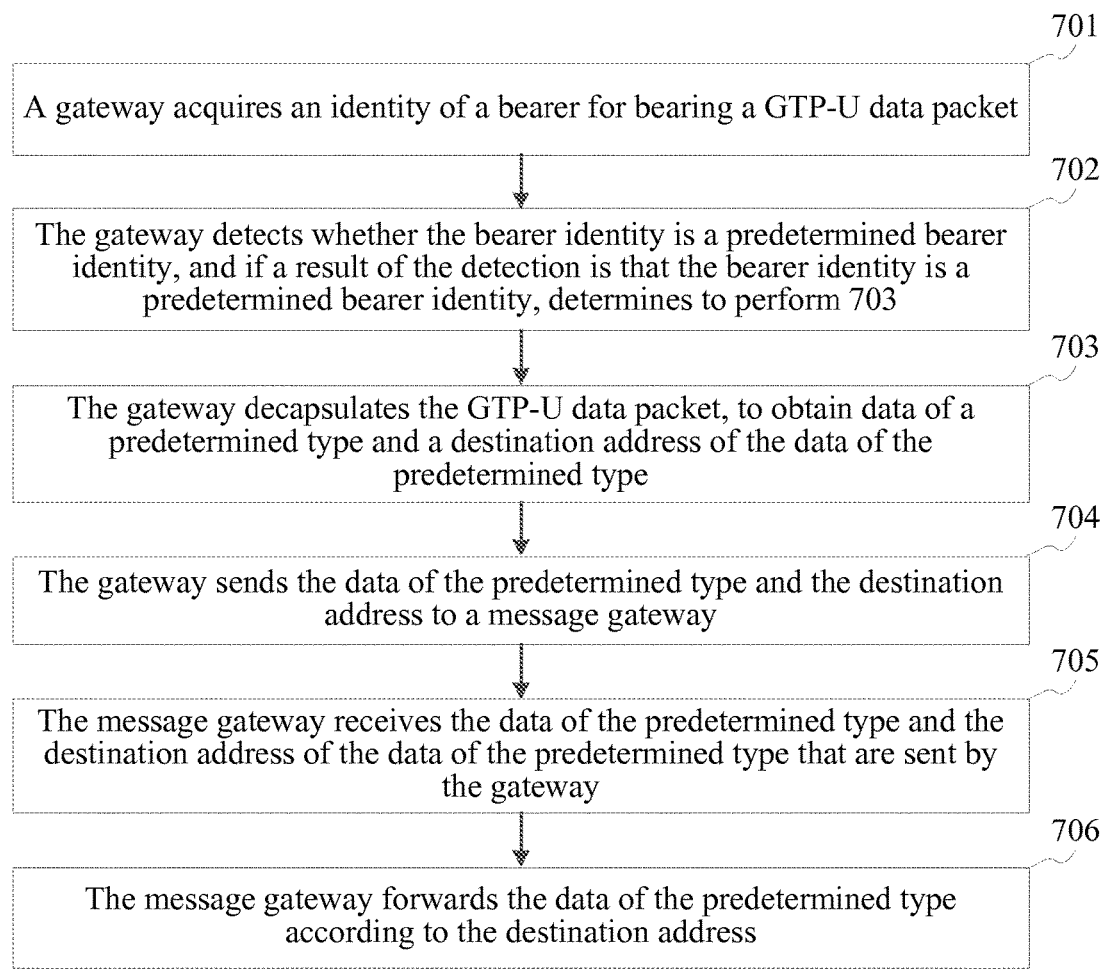
FIG. 7 is a method flowchart of a data transmission method according to Embodiment 3 of the present invention.

Referring to FIG. 7, FIG. 7 shows a method flowchart of a data transmission method according to Embodiment 3 of the present invention. The data transmission method is an uplink data sending method, and may be applied in an EPS. The data transmission method may include:

Step 701: A gateway acquires a bearer identity for bearing of a GTP-U data packet.

The GTP-U data packet is obtained by performing GTP-U protocol encapsulation on data received on an air interface. If an IP data packet is received on the air interface, the IP data packet may be encapsulated into a GTP-U data packet for transmission. If data of a predetermined type of a non-IP data packet is received on the air interface, the data of the predetermined type may be directly encapsulated into a GTP-U data packet for transmission, which avoids a problem of decreasing data transmission efficiency caused by adding an IP header in front of the data of the predetermined type. The data of the predetermined type may be small data, or may be data of another type, which is not limited in this embodiment. The small data may be a message generated by an application program, including a status message, a location message, a heartbeat message, a real-time message, and the like; or may be SIP signaling, a Push message, a control message, and the like.

Preferably, the destination address of the data of the predetermined type may be encapsulated along with the data of the predetermined type, so that the gateway can send the data of the predetermined type according to the destination address after decapsulating the GTP-U data packet.

Because data transmitted in the GTP-U data packet may be data of a predetermined type of a non-IP data packet or an IP data packet, to distinguish data transmitted in the GTP-U data packet, a predetermined bearer with a serving gateway may be established in advance, where the predetermined bearer is used to transmit data of a predetermined type.

Specifically, user equipment may send, to a mobility management network element in an attach procedure, a request of establishing a predetermined bearer dedicated to transmission of data of a predetermined type; after receiving the request sent by the user equipment, the mobility management network element may determine, according to the request, subscription information of the user equipment, a capability of the gateway, and the like, to establish the predetermined bearer, and indicates, in a session create request message sent to the gateway, that the predetermined bearer is used for transmitting data of a predetermined type; in this case, the gateway may store information of the predetermined bearer, such as a bearer identity, so as to determine, according to the identity of the predetermined bearer, that data transmitted is data of a predetermined type.

It should be noted additionally that, before detecting whether the bearer identity is a predetermined bearer identity, the method may further include: if the gateway is a packet data gateway, receiving the predetermined bearer identity that is from a mobility management network element and forwarded by a serving gateway, where the serving gateway is located between the mobility management network element and the packet data gateway; or if the gateway is a serving gateway, receiving the predetermined bearer identity sent by a mobility management network element.

The mobility management network element may send the predetermined bearer identity to the serving gateway, and if the gateway in this embodiment is a packet data gateway, after receiving the predetermined bearer identity, the serving gateway forwards the predetermined bearer identity to the packet data gateway, and the packet data gateway may store the predetermined bearer identity; or if the gateway in this embodiment is the serving gateway, the serving gateway may store the predetermined bearer identity.

Step 702: The gateway detects whether the bearer identity is a predetermined bearer identity, and if a result of the detection is that the bearer identity is a predetermined bearer identity, determines to perform step 703.

The gateway may compare the bearer identity acquired in step 701 with a pre-stored predetermined bearer identity; if a result of the comparison is that the bearer identity is the same as the predetermined bearer identity, it is determined that data transmitted in the GTP-U data packet is data of a predetermined type, step 703 is performed; or if a result of the comparison is that the bearer identity is different from the predetermined bearer identity, it is determined that data transmitted in the GTP-U data packet is data of a predetermined type, and the GTP-U data packet is processed according to an existing EPS procedure, which is not described in detail in this embodiment.

Step 703: The gateway decapsulates the GTP-U data packet, to obtain data of a predetermined type and a destination address of the data of the predetermined type.

Because the gateway detects that data transmitted in the GTP-U data packet is data of a predetermined type, the gateway may decapsulate the GTP-U data packet, to obtain the data of the predetermined type and the destination address. The destination address is a device that finally receives the data of the predetermined type, for example, a server or a system, which is not limited in this embodiment.

Step 704: The gateway sends the data of the predetermined type and the destination address to a message gateway.

The message gateway may be a newly added gateway in the EPS, where the message gateway supports a newly defined transmission protocol that is based on data of a predetermined type, and the gateway may send the data of the predetermined type and the destination address to the message gateway by using the transmission protocol. The newly defined transmission protocol for data of a predetermined type may be a Message-AP protocol, or the like, which is not limited in this embodiment.

Step 705: The message gateway receives the data of the predetermined type and the destination address of the data of the predetermined type that are sent by the gateway.

Based on the newly defined transmission protocol for data of a predetermined type, the message gateway can receive the data of the predetermined type and the destination address that are sent by the gateway.

Step 706: The message gateway forwards the data of the predetermined type according to the destination address.

Because the message gateway may be connected to a Push server, a P-CSCF, an application server, a cluster communications system, and the like, the message gateway may determine, according to the received destination address, a device corresponding to the data of the predetermined type, thereby forwarding the data of the predetermined type to the device. The Push server is used to transmit a Push message, the P-CSCF is used to transmit SIP signaling, the application server is used to transmit a small data packet, and the cluster system is used to transmit a control message.

Figure 8:
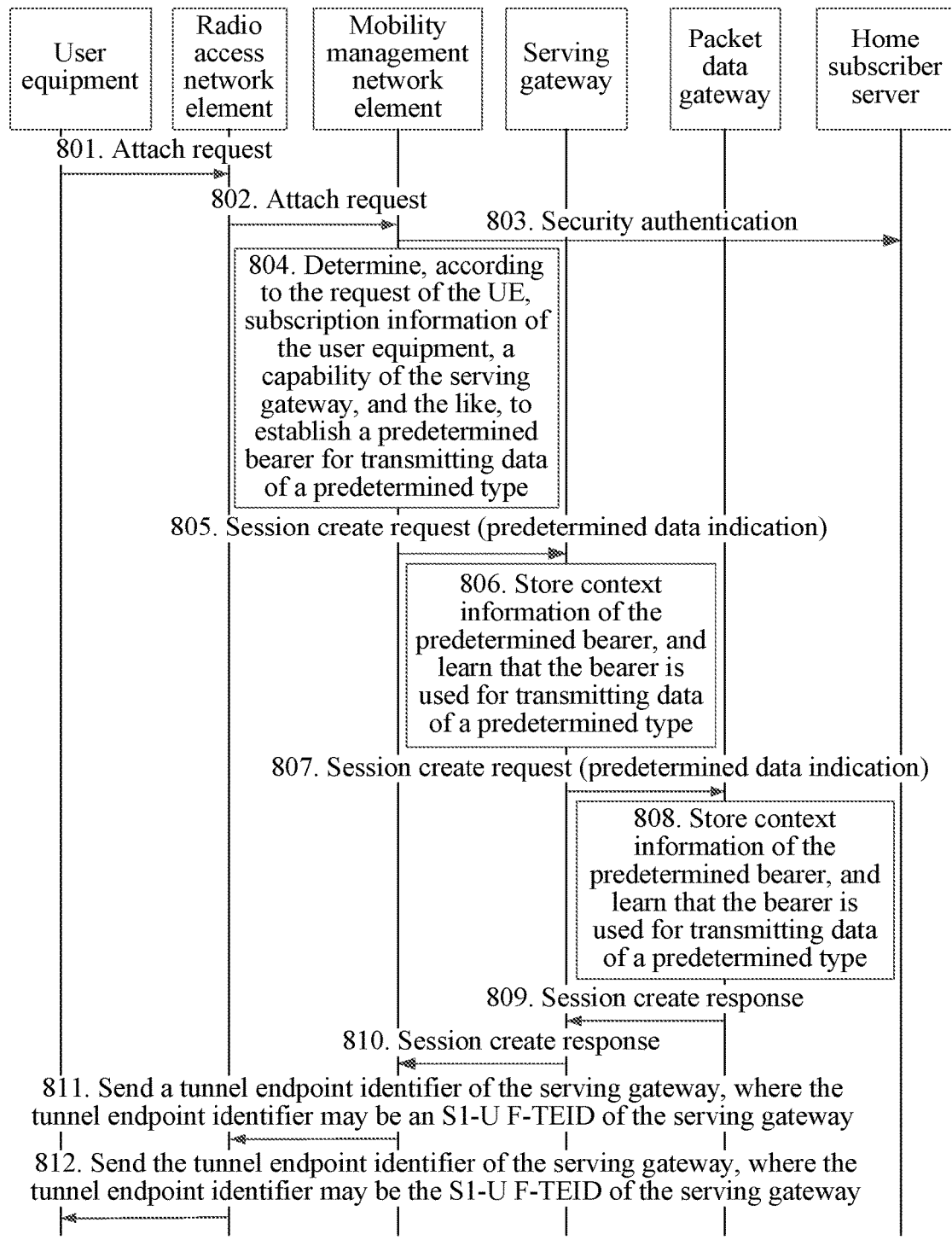
FIG. 8 is a schematic diagram of an application of a data transmission system according to Embodiment 3 of the present invention.

Referring to FIG. 8, this embodiment further provides a specific schematic flowchart of establishing a predetermined bearer, and a process of establishing a predetermined data bearer is as follows:

Step 801: User equipment sends an attach request to a radio access network element.

Step 802: The radio access network element sends an attach request to a mobility management network element.

Step 803: The mobility management network element performs security authentication with a home subscriber server.

Step 804: The mobility management network element determines, according to the request of the user equipment, subscription information of the user equipment, a capability of the serving gateway, and the like, to establish a predetermined bearer for transmitting data of a predetermined type.

Step 805: The mobility management network element sends a session create request to the serving gateway, where the session create request indicates that the predetermined bearer is used for transmitting data of a predetermined type.

Step 806: The serving gateway stores context information of the predetermined bearer, and learns that the predetermined bearer is used for transmitting data of a predetermined type.

Step 807: The serving gateway sends a session create request to a packet data gateway, where the session create request indicates that the predetermined bearer is used for transmitting data of a predetermined type.

Step 808: The packet data gateway stores the context information of the predetermined bearer, and learns that the predetermined bearer is used for transmitting data of a predetermined type.

Step 809: The packet data gateway sends a session create response to the serving gateway.

Step 810: The serving gateway sends a session create response to the mobility management network element.

Step 811: The mobility management network element sends a tunnel endpoint identifier of the serving gateway to the radio access network element, where the tunnel endpoint identifier may be an S1-U F-TEID of the serving gateway.

Step 812: The radio access network element sends the tunnel endpoint identifier of the serving gateway to the user equipment, where the tunnel endpoint identifier may be the S1-U F-TEID of the serving gateway.

In conclusion, in the data transmission method provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved. In addition, it is detected whether the bearer identity is a predetermined bearer identity; and it is determined that the data transmitted in the received GTP-U data packet is the data of the predetermined type if a result of the detection is that the bearer identity is a predetermined bearer identity, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 4

Figure 9:
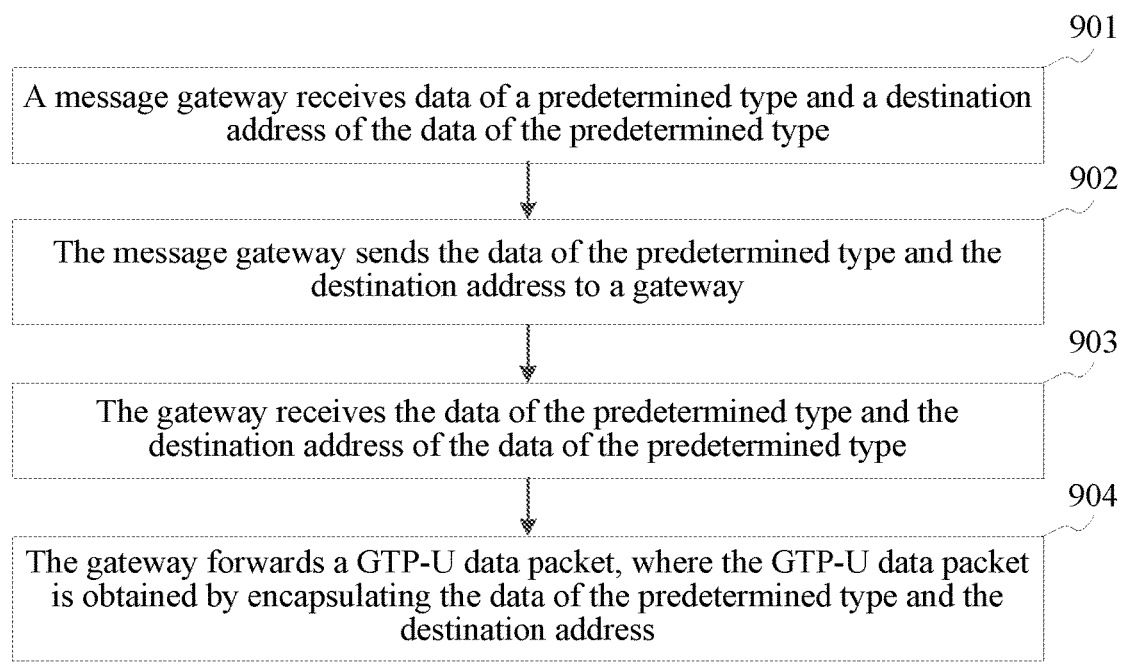
FIG. 9 is a method flowchart of a data transmission method according to Embodiment 4 of the present invention.

Referring to FIG. 9, FIG. 9 shows a method flowchart of a data transmission method according to Embodiment 4 of the present invention. The data transmission method is a downlink data receiving method, and may be applied in an EPS. The data transmission method may include:

Step 901: A message gateway receives data of a predetermined type and a destination address of the data of the predetermined type.

The data of the predetermined type may be small data, or may be data of another type, which is not limited in this embodiment. The small data may be a message generated by an application program, including a status message, a location message, a heartbeat message, a real-time message, and the like; or may be SIP signaling, a Push message, a control message, and the like.

Because the message gateway may be connected to a Push server, a P-CSCF, an application server, a cluster communications system, and the like, the message gateway may receive the data of the predetermined type and the destination address from a device connected thereto, and certainly, may also acquire the data of the predetermined type in another manner, which is not limited in this embodiment.

Step 902: The message gateway sends the data of the predetermined type and the destination address to a gateway.

The message gateway may send, according to the destination address, the data of the predetermined type to a network to which a destination node belongs, where the destination node is identified by the destination address, so that the gateway can forward a GTP-U data packet, where the GTP-U data packet is obtained by encapsulating the data of the predetermined type and the destination address.

Step 903: The gateway receives the data of the predetermined type and the destination address of the data of the predetermined type.

Based on a newly defined transmission protocol for data of a predetermined type, the gateway can receive the data of the predetermined type and the destination address that are sent by the message gateway.

Step 904: The gateway forwards a GTP-U data packet, where the GTP-U data packet is obtained by encapsulating the data of the predetermined type and the destination address.

Because the gateway may send the data of the predetermined type and the destination address by using a GTP-U protocol, the gateway needs to encapsulate the data of the predetermined type and the destination address into a GTP-U data packet, and forwards the GTP-U data packet.

In conclusion, in the data transmission method provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved.

Embodiment 5

Figure 10:
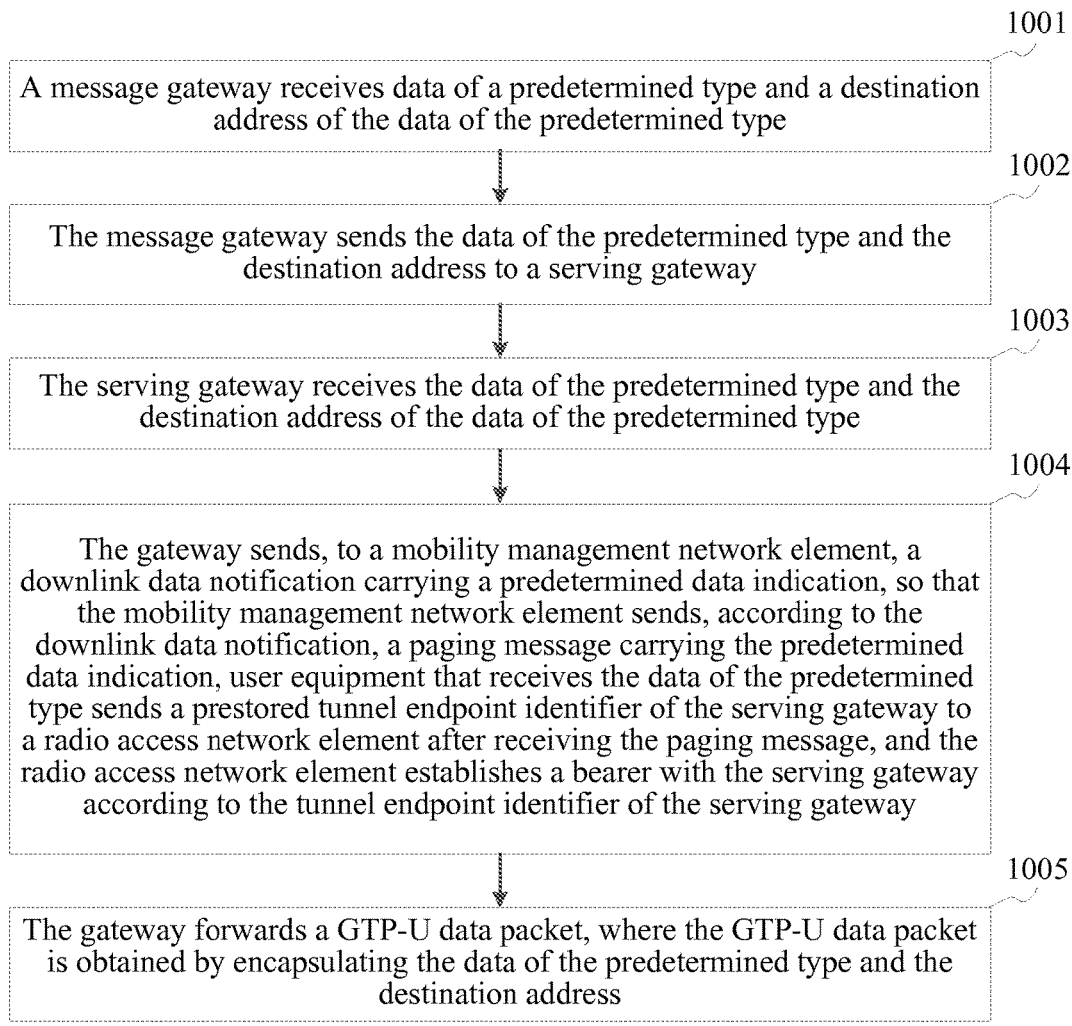
FIG. 10 is a schematic diagram of an application of a data transmission system according to Embodiment 4 of the present invention.

Referring to FIG. 10, FIG. 10 shows a method flowchart of a data transmission method according to Embodiment 5 of the present invention. The data transmission method is a downlink data receiving method, and may be applied in an EPS. This embodiment is described by using an example in which a gateway is a serving gateway, and the data transmission method may include:

Step 1001: A message gateway receives data of a predetermined type and a destination address of the data of the predetermined type.

Specifically, refer to the description in step 901 for details of a process of receiving, by the message gateway, the data of the predetermined type and the destination address.

Step 1002: The message gateway sends the data of the predetermined type and the destination address to a gateway.

In this embodiment, the message gateway may send, according to the destination address, the data of the predetermined type to a network to which a destination node belongs, where the destination node is identified by the destination address. Specifically, the data of the predetermined type and the destination address may be sent according to a newly defined transmission protocol for data of a predetermined type, that is, a Message AP protocol, so that the gateway can forward a GTP-U data packet that is obtained by encapsulating the data of the predetermined type and the destination address.

Step 1003: The gateway receives the data of the predetermined type and the destination address of the data of the predetermined type.

Based on the newly defined transmission protocol for data of a predetermined type, that is, the Message-AP protocol, the gateway can receive the data of the predetermined type and the destination address that are sent by the message gateway.

The gateway in this embodiment is a serving gateway in the EPS, and in this case, the serving gateway can directly receive the data of the predetermined type and the destination address that are sent by the message gateway, or may receive the data of the predetermined type and the destination address that are forwarded by a packet data gateway.

Specifically, the receiving data of a predetermined type and a destination address of the data of the predetermined type that are sent by a message gateway may include:

receiving the data of the predetermined type and the destination address that are from the message gateway and forwarded by a packet data gateway, where the packet data gateway is located between the serving gateway and the message gateway.

Because the packet data gateway is located between the serving gateway and the message gateway, the packet data gateway may receive data of a predetermined type and a destination address that are sent by a message gateway, and forward the data of the predetermined type and the destination address to the serving gateway.

Step 1004: The gateway sends, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

If the serving gateway receives data sent by the message gateway, the serving gateway may determine that the data is data of a predetermined type, and in this case, the predetermined data indication may be generated by the serving gateway or the message gateway; or if the serving gateway receives data sent by the packet data gateway, the predetermined data indication may be generated by the packet data gateway or the message gateway.

Specifically, a flag bit may be set in the paging message to identify the predetermined data indication. For example, the flag bit may be set to 0 to identify data of a predetermined type; or the flag bit may be set to 1 to identify data of a predetermined type; certainly, the predetermined data indication in the paging message may also be set in another manner, which is not limited in this embodiment.

When sending the downlink data notification, because the gateway is not sure about a location of the user equipment, the serving gateway may send, to the mobility management network element, the downlink data notification carrying the predetermined data indication, so that the mobility management network element sends, to all user equipment in a given area, paging messages carrying the predetermined data indication, so that after receiving the paging message, user equipment that needs to receive data may determine that the data is data of a predetermined type, and therefore, can receive the data of the predetermined type by using a predetermined bearer. Different from an existing method of establishing a transmission channel between a gateway and a radio access network element in advance by using a Service Request message and then transmitting data through the transmission channel, in this embodiment, a serving gateway may send, in an attach procedure, a tunnel endpoint identifier of the serving gateway to user equipment, so that the user equipment sends the tunnel endpoint identifier of the serving gateway to a radio access network element while sending an empty IP data packet; the radio access network element establishes a bearer with the serving gateway according to the tunnel endpoint identifier of the serving gateway, and sends the empty IP data packet and the tunnel endpoint identifier of the radio access network element to the serving gateway; the serving gateway saves the tunnel endpoint identifier of the radio access network element in context message, thereby receiving, according to the predetermined bearer, data of a predetermined type and a destination address that are forwarded by the serving gateway.

The radio access network element may establish a new bearer with the serving gateway according to the tunnel endpoint identifier of the serving gateway; or the radio access network element may select, from at least one predetermined bearer according to the tunnel endpoint identifier of the serving gateway, a predetermined bearer for transmitting the data of the predetermined type.

Step 1005: The gateway forwards a GTP-U data packet, where the GTP-U data packet is obtained by encapsulating the data of the predetermined type and the destination address.

Because the serving gateway may send the data of the predetermined type and the destination address by using a GTP-U protocol, the serving gateway needs to encapsulate the data of the predetermined type and the destination address into a GTP-U data packet, and sends the GTP-U data packet. Further, the serving gateway may also determine a destination address in the GTP-U data packet according to the destination address, thereby sending the GTP-U data packet.

Figure 11:
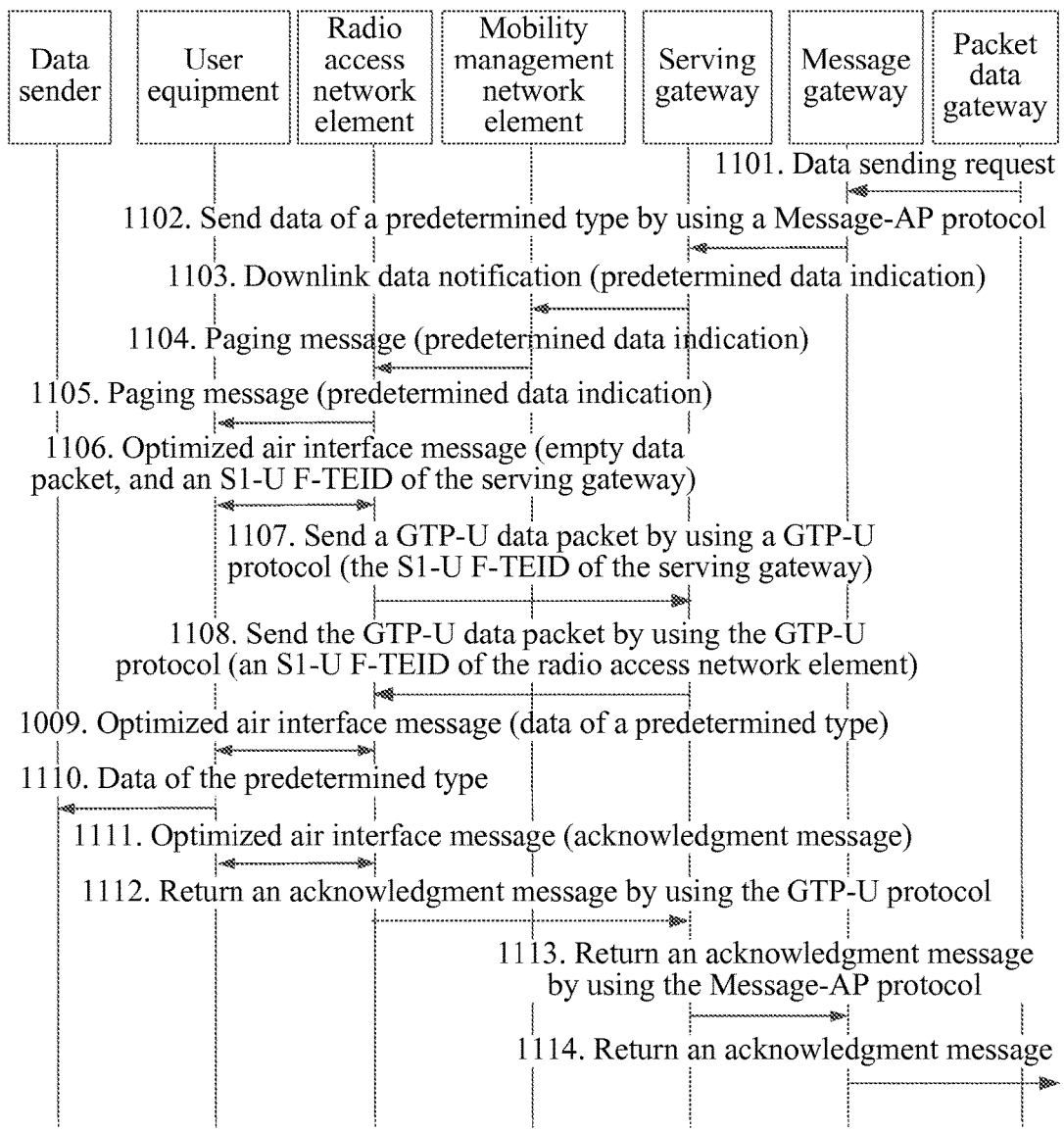
FIG. 11 is a method flowchart of a data transmission method according to Embodiment 5 of the present invention.

Referring to FIG. 11, this embodiment further provides a schematic flowchart of a specific application of the foregoing method, and a data transmission process is specifically as follows:

Step 1101: A data sender sends a data sending request to a message gateway.

Step 1102: The message gateway sends data of a predetermined type to a serving gateway.

Step 1103: The serving gateway sends, to a mobility management network element, a downlink data notification carrying a predetermined data indication.

Step 1104: The mobility management network element sends, to a radio access network element, a paging message carrying the predetermined data indication.

Step 1105: The radio access network element sends, to user equipment, a paging message carrying the predetermined data indication.

Step 1106: The user equipment sends an empty data packet and an S1-U F-TEID of the serving gateway to the radio access network element by using an optimized air interface message.

Step 1107: The radio access network element allocates a new S1-U F-TEID to the data packet, where the new S1-U F-TEID is an S1-U F-TEID of the radio access network element, encapsulates the data packet into a GTP-U data packet, and sends the GTP-U data packet to the serving gateway according to the S1-U F-TEID of the serving gateway.

Step 1108: The serving gateway sends data of a predetermined type to the radio access network element according to the S1-U F-TEID of the radio access network element.

Step 1109: The radio access network element sends, to the user equipment and by using an optimized air interface message, the data of the predetermined type obtained after decapsulation.

Step 1110: The user equipment sends the data of the predetermined type to a data receiver.

Step 1111: The user equipment returns an acknowledgment message to the radio access network element by using an optimized air interface message.

Step 1112: The radio access network element returns an acknowledgment message to the serving gateway by using a GTP-U protocol.

Step 1113: The serving gateway returns an acknowledgment message to the message gateway by using a Message-AP protocol.

Step 1114: The message gateway returns an acknowledgment message to the data sender.

In conclusion, in the data transmission method provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved. In addition, by sending, to a mobility management network element, a downlink data notification carrying a predetermined data indication, so that the mobility management network element sends, according to the downlink data notification, a paging message carrying the predetermined data indication, user equipment that receives the data of the predetermined type sends a pre-stored tunnel endpoint identifier of a serving gateway to a radio access network element after receiving the paging message, and the radio access network element establishes a bearer with the serving gateway according to the tunnel endpoint identifier of the serving gateway, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 6

Figure 12:
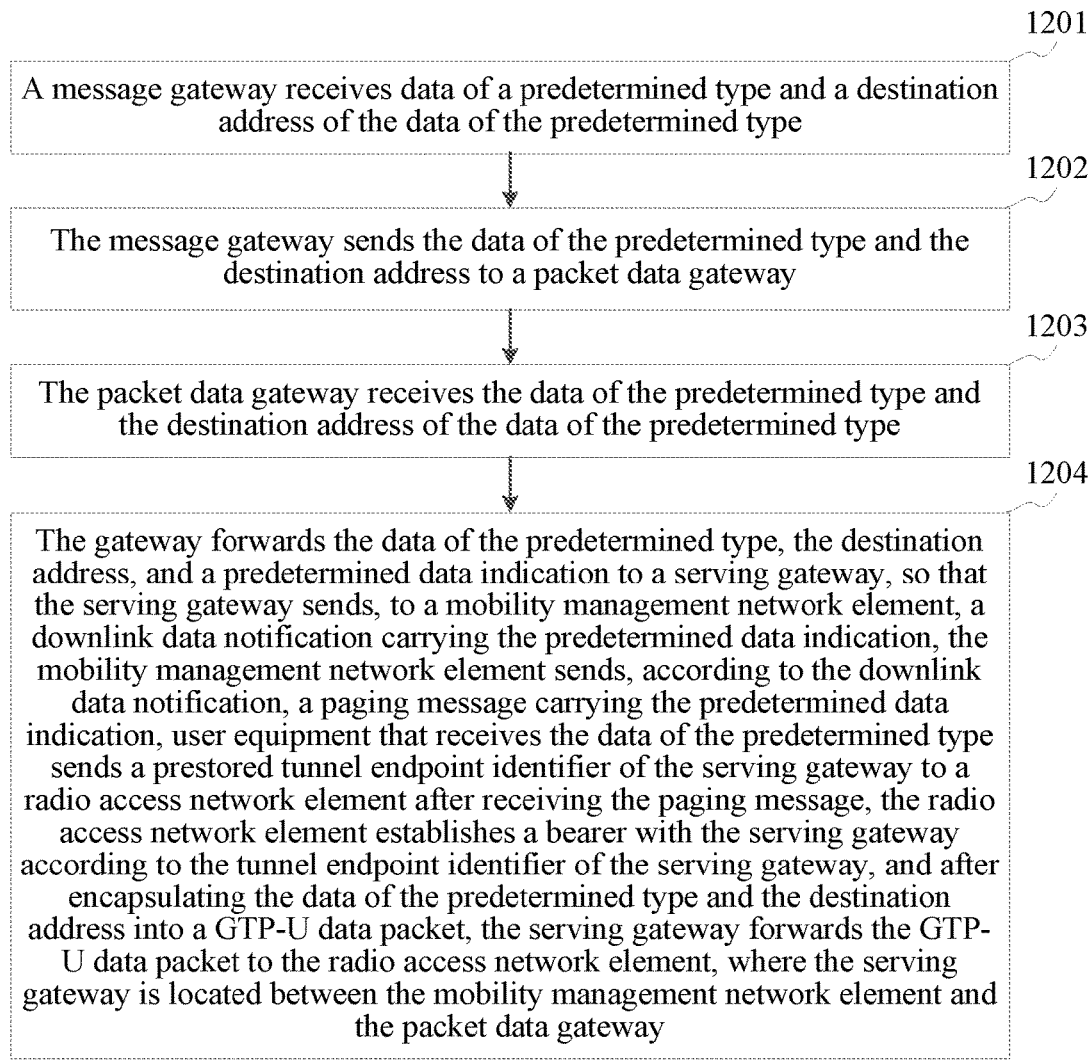
FIG. 12 is a schematic diagram of an application of a data transmission system according to Embodiment 5 of the present invention.

Referring to FIG. 12, FIG. 12 shows a method flowchart of a data transmission method according to Embodiment 5 of the present invention. The data transmission method is a downlink data receiving method, and may be applied in an EPS. This embodiment is described by using an example in which a gateway is a packet data gateway, and the data transmission method may include:

Step 1201: A message gateway receives data of a predetermined type and a destination address of the data of the predetermined type.

Specifically, refer to the description in step 901 for details of a process of receiving, by the message gateway, the data of the predetermined type and the destination address of the data of the predetermined type.

Step 1202: The message gateway sends the data of the predetermined type and the destination address to a gateway.

In this embodiment, the message gateway may send, according to the destination address, the data of the predetermined type to a network to which a destination node belongs, where the destination node is identified by the destination address. Specifically, the data of the predetermined type may be sent according to a newly defined transmission protocol for data of a predetermined type, that is, a Message AP protocol, so that the gateway can forward a GTP-U data packet that is obtained by encapsulating the data of the predetermined type and the destination address.

Step 1203: The gateway receives the data of the predetermined type and the destination address of the data of the predetermined type that are sent by the message gateway.

Based on the newly defined transmission protocol based on data of a predetermined type, that is, the Message-AP protocol, the gateway can receive the data of the predetermined type and the destination address that are sent by the message gateway.

Step 1204: The gateway forwards the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into a GTP-U data packet, the serving gateway forwards the GTP-U data packet to the radio access network element, where the serving gateway is located between the mobility management network element and the packet data gateway.

In this embodiment, if the packet data gateway receives data sent by the message gateway, the packet data gateway may determine that the data is data of a predetermined type. The predetermined data indication may be generated by the packet data gateway or the message gateway, and for details, refer to the description in step 1004.

Because the gateway in this embodiment is a packet data gateway in the EPS, the packet data gateway may send the received data of the predetermined type, the destination address and the predetermined data indication to the serving gateway, so that the serving gateway determines that the data is data of a predetermined type according to the predetermined data indication, and encapsulates the data of the predetermined type and the destination address into a GTP-U data packet and forwards the GTP-U data packet.

Specifically, for details of the process of establishing, by the serving gateway, a connection with the radio access network element, and encapsulating, by the serving gateway, the data of the predetermined type and the destination address into a GTP-U data packet, and forwarding the GTP-U data packet, refer to the content of step 1004 and step 1005, which are not described in detail herein again.

Figure 13:
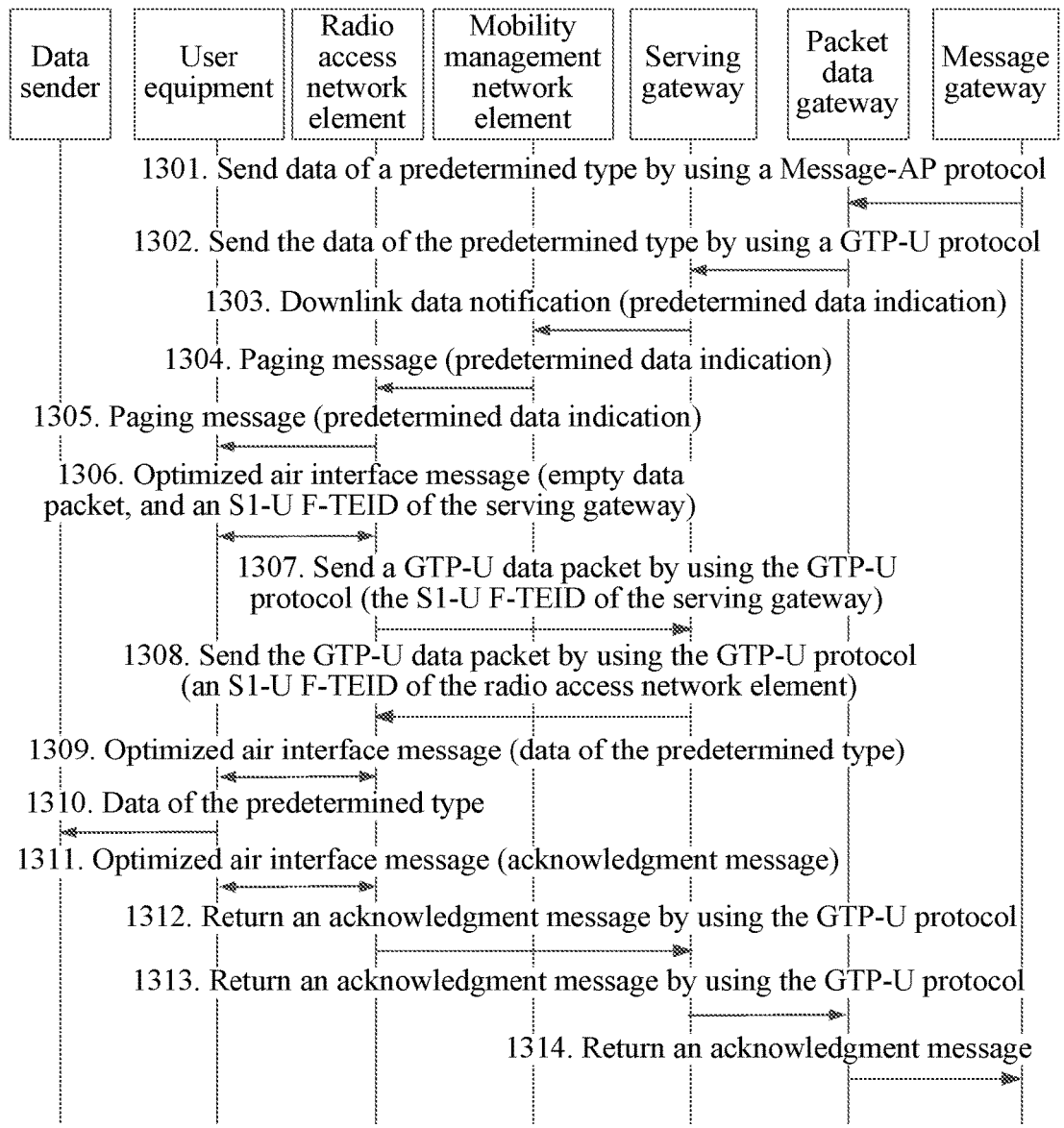
FIG. 13 is a schematic structural diagram of a data transmission system according to Embodiment 6 of the present invention.

Referring to FIG. 13, this embodiment further provides a schematic flowchart of a specific application of the foregoing method, and a data transmission process is specifically as follows:

Step 1301: A message gateway sends data of a predetermined type to a packet data gateway by using a Message-AP protocol.

Step 1302: The packet data gateway sends the data of the predetermined type to a serving gateway by using a GTP-U protocol.

Step 1303: The serving gateway sends, to a mobility management network element, a downlink data notification carrying a predetermined data indication.

Step 1304: The mobility management network element sends, to a radio access network element, a paging message carrying the predetermined data indication.

Step 1305: The radio access network element sends, to user equipment, a paging message carrying the predetermined data indication.

Step 1306: The user equipment sends an empty data packet and an S1-U F-TEID of the serving gateway to the radio access network element by using an optimized air interface message.

Step 1307: The radio access network element allocates a new S1-U F-TEID to the data packet, where the new S1-U F-TEID is an S1-U F-TEID of the radio access network element, encapsulates the data packet into a GTP-U data packet, and sends the GTP-U data packet to the serving gateway according to the S1-U F-TEID of the serving gateway.

Step 1308: The serving gateway sends the data of the predetermined type to the radio access network element according to the S1-U F-TEID of the radio access network element.

Step 1309: The radio access network element sends the data of the predetermined type to the user equipment and by using an optimized air interface message.

Step 1310: The user equipment sends the data of the predetermined type to a data receiver.

Step 1311: The user equipment sends an acknowledgment message to the radio access network element by using an air interface message.

Step 1312: The radio access network element sends an acknowledgment message to the serving gateway by using the GTP-U protocol.

Step 1313: The serving gateway sends an acknowledgment message to the message gateway by using the Message-AP protocol.

Step 1314: The message gateway sends an acknowledgment message to a data sender.

In conclusion, in the data transmission method provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved. In addition, by forwarding the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a prestored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, where the serving gateway is located between the mobility management network element and the packet data gateway, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 7

Figure 14:
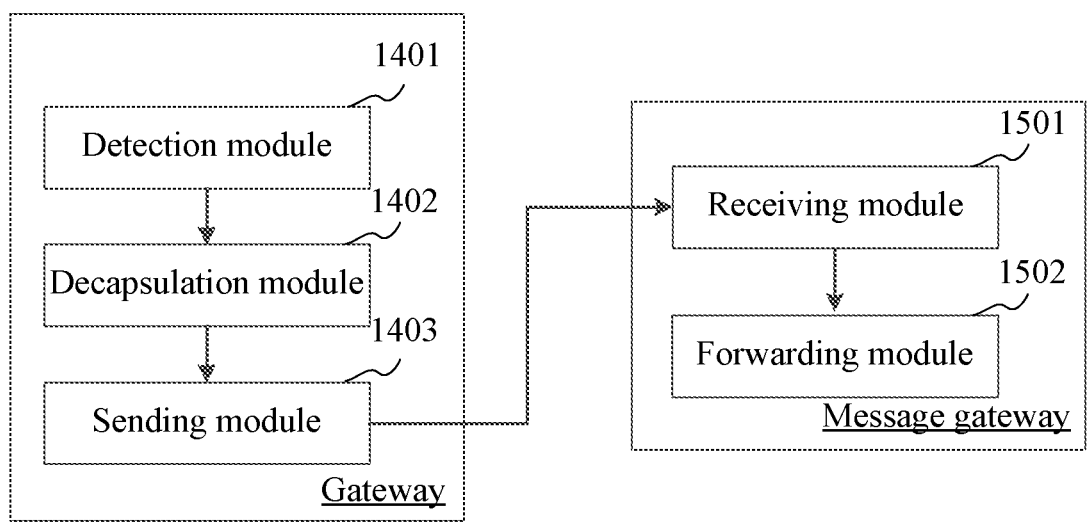
FIG. 14 is a schematic structural diagram of a data transmission system according to Embodiment 7 of the present invention.

Referring to FIG. 14, FIG. 14 shows a structural block diagram of a data transmission system according to Embodiment 7 of the present invention, where the data transmission system may be applied in an EPS. The data transmission system may include:

a detection module 1401, configured to detect whether data transmitted in a received GTP-U data packet is data of a predetermined type;

a decapsulation module 1402, configured to: if a result of the detection by the detection module 1401 is that data transmitted in the GTP-U data packet is data of a predetermined type, decapsulate the GTP-U data packet, to obtain the data of the predetermined type and a destination address of the data of the predetermined type;

a sending module 1403, configured to send, to a message gateway, the data of the predetermined type and the destination address that are obtained through decapsulation by the decapsulation module 1402, so that the message gateway forwards the data of the predetermined type according to the destination address;

a receiving module 1501, configured to receive data of a predetermined type and a destination address of the data of the predetermined type that are sent by a gateway, where the data of the predetermined type and the destination address are obtained by the gateway by detecting whether data transmitted in a received GTP-U data packet is the data of the predetermined type, and by decapsulating the GTP-U data packet if a result of the detection is that the data transmitted in the GTP-U data packet is the data of the predetermined type; and a forwarding module 1502, configured to forward the data of the predetermined type according to the destination address received by the receiving module 1501.

In conclusion, in the data transmission system provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved.

Embodiment 8

Figure 15:
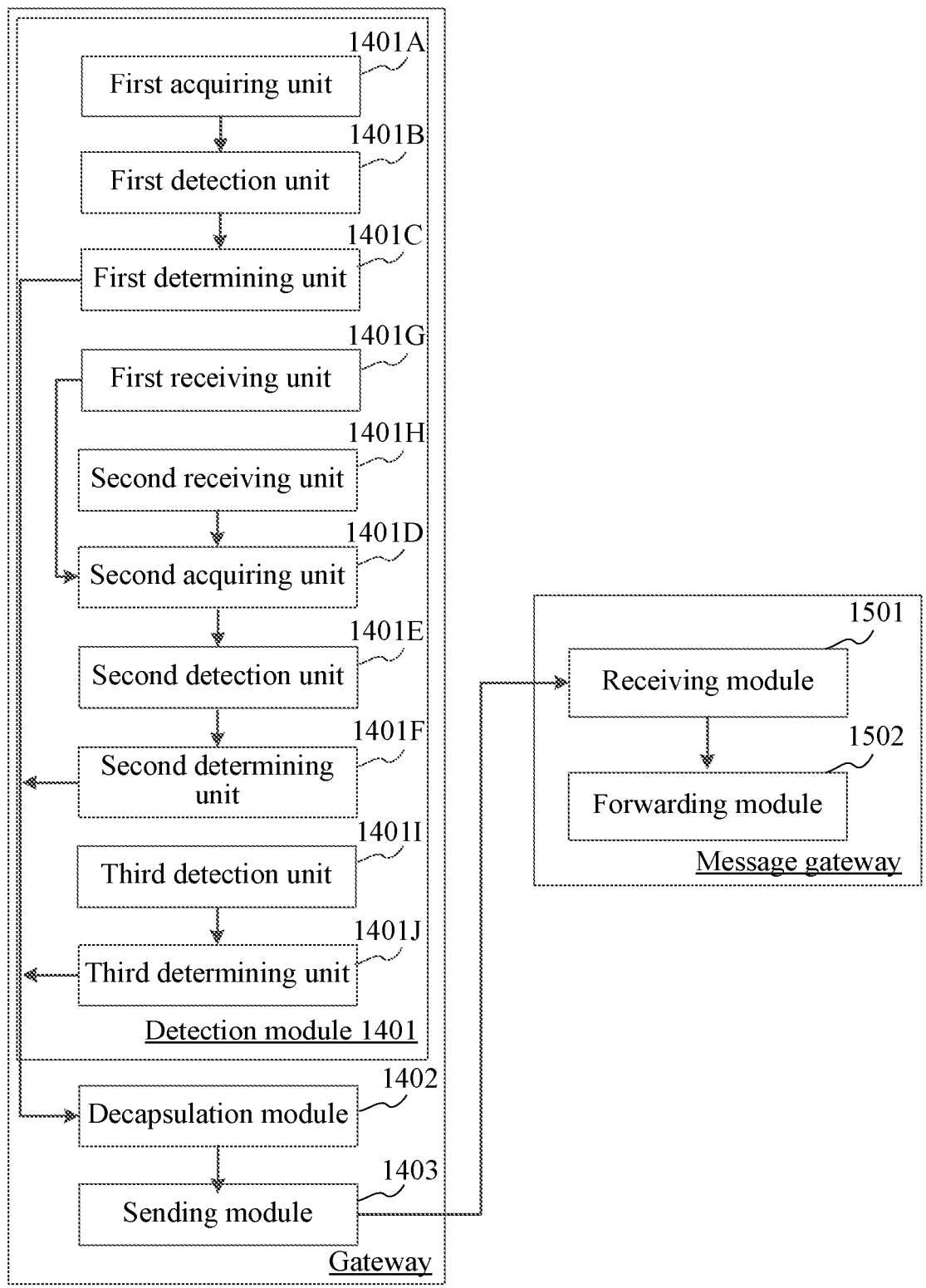
FIG. 15 is a schematic structural diagram of a data transmission system according to Embodiment 8 of the present invention.

Referring to FIG. 15, FIG. 15 shows a structural block diagram of a data transmission system according to Embodiment 8 of the present invention, where the data transmission system may be applied in an EPS. The data transmission system may include: a gateway and a message gateway; the gateway may include a detection module 1401, a decapsulation module 1402, and a sending module 1403; and the message gateway may include: a receiving module 1501 and a forwarding module 1502.

The detection module 1401 is configured to detect whether data transmitted in a received GTP-U data packet is data of a predetermined type.

The decapsulation module 1402 is configured to: if a result of the detection by the detection module 1401 is that data transmitted in the GTP-U data packet is data of a predetermined type, decapsulate the GTP-U data packet, to obtain the data of the predetermined type and a destination address of the data of the predetermined type.

The sending module 1403 is configured to send, to the message gateway, the data of the predetermined type and the destination address that are obtained through decapsulation by the decapsulation module 1402, so that the message gateway forwards the data of the predetermined type according to the destination address.

The receiving module 1501 is configured to receive data of a predetermined type and a destination address of the data of the predetermined type that are sent by the gateway, where the data of the predetermined type and the destination address are obtained by the gateway by detecting whether data transmitted in a received GTP-U data packet is the data of the predetermined type, and by decapsulating the GTP-U data packet if a result of the detection is that the data transmitted in the GTP-U data packet is the data of the predetermined type.

The forwarding module 1502 is configured to forward the data of the predetermined type according to the destination address received by the receiving module 1501.

Further, the detection module 1401 may include:

a first acquiring unit 1401A, configured to acquire a message type in a header of the GTP-U data packet;

a first detection unit 1401B, configured to detect whether the message type acquired by the first acquiring unit 1401A is a predetermined message type; and a first determining unit 1401C, configured to: if a result of the detection by the first detection unit 1401B is that the message type is a predetermined message type, determine that the data transmitted in the received GTP-U data packet is the data of the predetermined type.

Further, if the gateway is a packet data gateway, the message type is set in advance by a radio access network element or by a serving gateway that is located between the radio access network element and the packet data gateway.

If the gateway is a serving gateway, the message type is set in advance by a radio access network element.

Further, the detection module 1401 may include:

a second acquiring unit 1401D, configured to acquire an identity of a bearer bearing the GTP-U data packet;

a second detection unit 1401E, configured to detect whether the bearer identity acquired by the second acquiring unit 1401D is a predetermined bearer identity; and a second determining unit 1401F, configured to: if a result of the detection by the second detection unit 1401E is that the bearer identity is a predetermined bearer identity, determine that the data transmitted in the received GTP-U data packet is the data of the predetermined type.

Further, the detection module 1401 may further include:

a first receiving unit 1401G, configured to: before the second detection unit 1401E detects whether the bearer identity is a predetermined bearer identity, if the gateway is a packet data gateway, receive the predetermined bearer identity that is from a mobility management network element and forwarded by a serving gateway, where the serving gateway is located between the mobility management network element and the packet data gateway; and a second receiving unit 1401H, configured to: before the second detection unit 1401E detects whether the bearer identity is a predetermined bearer identity, if the gateway is a serving gateway, receive the predetermined bearer identity sent by a mobility management network element.

Further, if the gateway is a serving gateway, the detection module 1401 further includes:

a third detection unit 1401I, configured to detect whether the GTP-U data packet carries a tunnel endpoint identifier of a radio access network element; and a third determining unit 1401J, configured to: if a result of the detection by the third detection unit 1401I is that the GTP-U data packet carries a tunnel endpoint identifier of a radio access network element, determine that the data transmitted in the received GTP-U data packet is the data of the predetermined type.

In conclusion, in the data transmission system provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved. In addition, it is detected whether the GTP-U data packet carries a tunnel endpoint identifier of a radio access network element; and it is determined that the data transmitted in the received GTP-U data packet is the data of the predetermined type if a result of the detection is that the GTP-U data packet carries a tunnel endpoint identifier of a radio access network element, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 9

Figure 16:
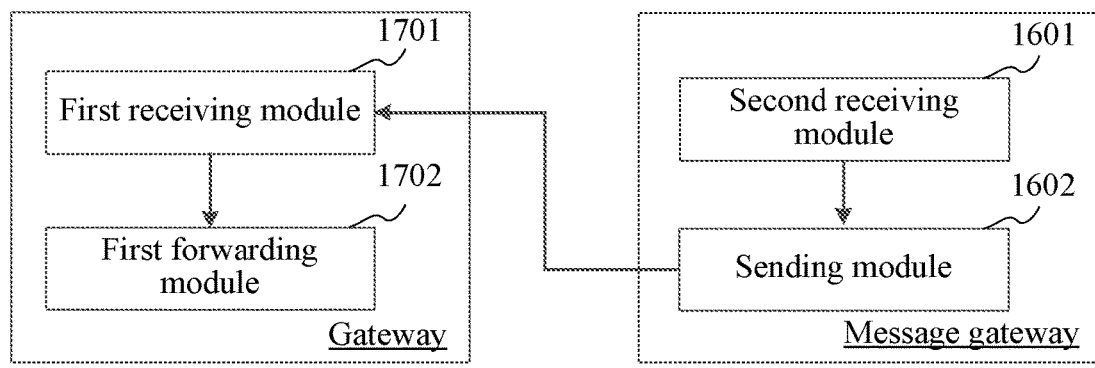
FIG. 16 is a schematic structural diagram of a data transmission system according to Embodiment 9 of the present invention.

Referring to FIG. 16, FIG. 16 shows a structural block diagram of a data transmission system according to Embodiment 9 of the present invention, where the data transmission system may be applied in an EPS. The data transmission system may include:

a second receiving module 1601, configured to receive data of a predetermined type and a destination address of the data of the predetermined type;

a sending module 1602, configured to send, to a gateway, the data of the predetermined type and the destination address that are received by the second receiving module 1601, so that the gateway receives the data of the predetermined type and the destination address that are sent by a message gateway, and forwards a GTP-U data packet, where the GTP-U data packet is obtained by encapsulating the data of the predetermined type and the destination address;

a first receiving module 1701, configured to receive data of a predetermined type and a destination address of the data of the predetermined type that are sent by a message gateway; and a first forwarding module 1702, configured to forward a GTP-U data packet, where the GTP-U data packet is obtained by encapsulating the data of the predetermined type and the destination address.

In conclusion, in the data transmission system provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved.

Embodiment 10

Figure 17:
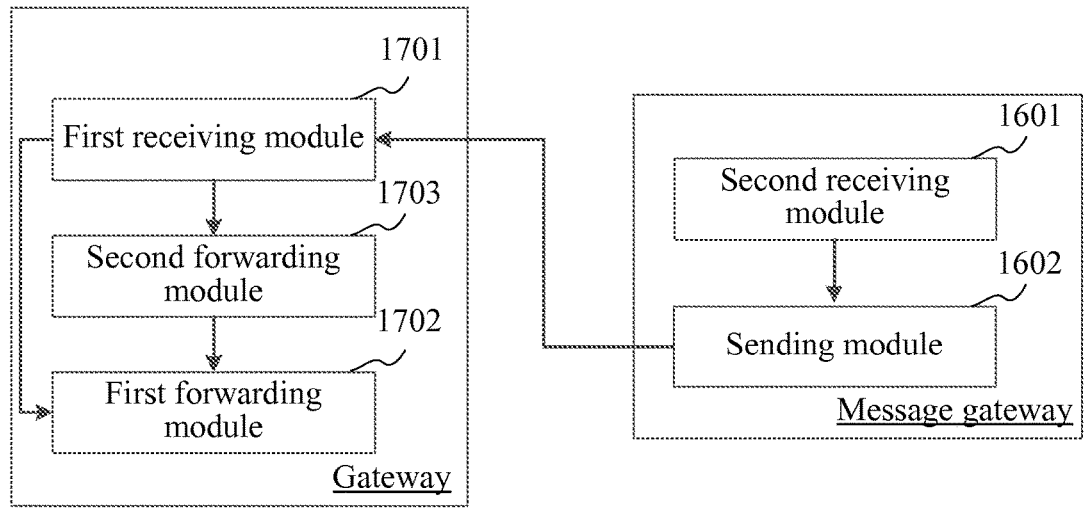
FIG. 17 is a schematic structural diagram of a data transmission system according to Embodiment 10 of the present invention.

Referring to FIG. 17, FIG. 17 shows a structural block diagram of a data transmission system according to Embodiment 10 of the present invention, where the data transmission system may be applied in an EPS. The data transmission system may include: a gateway and a message gateway; the gateway may include: a first receiving module 1701 and a first forwarding module 1702; and the message gateway may include: a second receiving module 1601 and a sending module 1602.

The second receiving module 1601 is configured to receive data of a predetermined type and a destination address of the data of the predetermined type.

The sending module 1602 is configured to send, to the gateway, the data of the predetermined type and the destination address that are received by the second receiving module 1601, so that the gateway receives the data of the predetermined type and the destination address that are sent by the message gateway, and forwards a GTP-U data packet, where the GTP-U data packet is obtained by encapsulating the data of the predetermined type and the destination address.

The first receiving module 1701 is configured to receive data of a predetermined type and a destination address of the data of the predetermined type that are sent by the message gateway.

The first forwarding module 1702 is configured to forward a GTP-U data packet, where the GTP-U data packet is obtained by encapsulating the data of the predetermined type and the destination address that are received by the first receiving module 1701.

Further, if the gateway is a serving gateway, the gateway may further include:
- a second forwarding module 1703, configured to: before the first forwarding module 1702 forwards the GTP-U data packet, send, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

Further, the first receiving module 1701 is configured to receive the data of the predetermined type and the destination address that are from the message gateway and forwarded by a packet data gateway, where the packet data gateway is located between the serving gateway and the message gateway.

Further, if the gateway is a packet data gateway, the first forwarding module 1702 is configured to forward the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, where the serving gateway is located between the mobility management network element and the packet data gateway.

In conclusion, in the data transmission system provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved. In addition, by sending, to a mobility management network element, a downlink data notification carrying a predetermined data indication, so that the mobility management network element sends, according to the downlink data notification, a paging message carrying the predetermined data indication, user equipment that receives the data of the predetermined type sends a pre-stored tunnel endpoint identifier of a serving gateway to a radio access network element after receiving the paging message, and the radio access network element establishes a bearer with the serving gateway according to the tunnel endpoint identifier of the serving gateway, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 11

Figure 18:
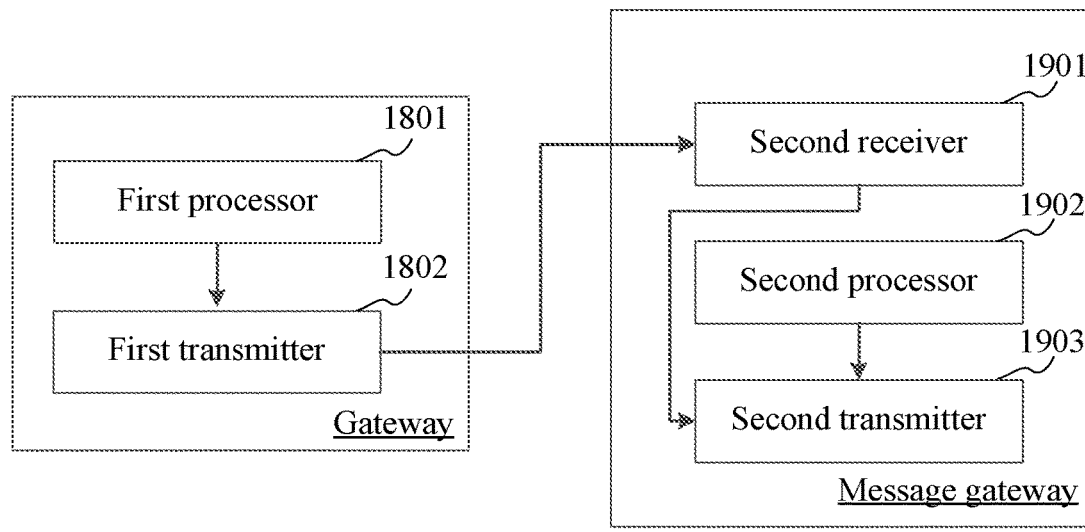
FIG. 18 is a schematic structural diagram of a data transmission system according to Embodiment 11 of the present invention.

Referring to FIG. 18, FIG. 18 shows a structural block diagram of a data transmission system according to Embodiment 11 of the present invention, where the data transmission system may be applied in an EPS. The data transmission system may include:
- a first processor 1801, configured to detect whether data transmitted in a received GTP-U data packet is data of a predetermined type; and if a result of the detection is that data transmitted in the GTP-U data packet is data of a predetermined type, decapsulate the GTP-U data packet, to obtain the data of the predetermined type and a destination address of the data of the predetermined type;
- a first transmitter 1802, configured to send, to a message gateway, the data of the predetermined type and the destination address that are obtained through decapsulation by the first processor 1801, so that the message gateway forwards the data of the predetermined type according to the destination address;
- a second receiver 1901, configured to receive data of a predetermined type and a destination address of the data of the predetermined type that are sent by a gateway, where the data of the predetermined type and the destination address are obtained by the gateway by detecting whether data transmitted in a received GTP-U data packet is the data of the predetermined type, and by decapsulating the GTP-U data packet if a result of the detection is that the data transmitted in the GTP-U data packet is the data of the predetermined type;
- a second processor 1902, configured to control a second transmitter 1903 to forward the data of the predetermined type according to the destination address received by the second receiver 1901; and
- the second transmitter 1903, configured to forward, under the control of the second processor 1902, the data of the predetermined type according to the destination address received by the second receiver 1901.

In conclusion, in the data transmission system provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved.

Embodiment 12

Figure 19:
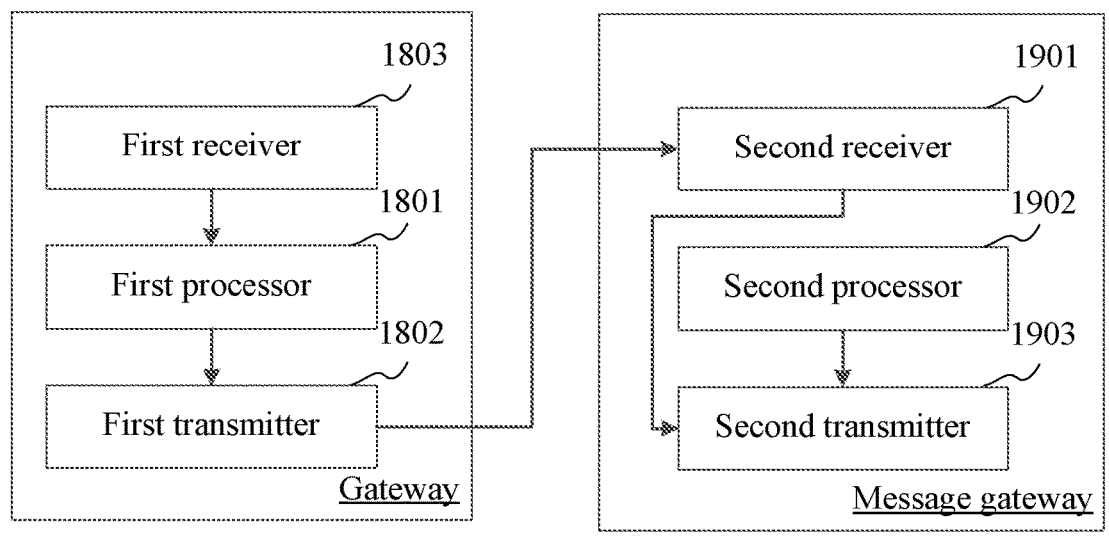
FIG. 19 is a schematic structural diagram of a data transmission system according to Embodiment 12 of the present invention.

Referring to FIG. 19, FIG. 19 shows a structural block diagram of a data transmission system according to Embodiment 12 of the present invention, where the data transmission system may be applied in an EPS. The data transmission system may include: a gateway and a message gateway; the gateway may include: a first processor 1801 and a first transmitter 1802; and the message gateway may include: a second receiver 1901, a second processor 1902, and a second transmitter 1903.

The first processor 1801 is configured to detect whether data transmitted in a received GTP-U data packet is data of a predetermined type; and if a result of the detection is that data transmitted in the GTP-U data packet is data of a predetermined type, decapsulate the GTP-U data packet, to obtain the data of the predetermined type and a destination address of the data of the predetermined type.

The first transmitter 1802 is configured to send, to the message gateway, the data of the predetermined type and the destination address that are obtained through decapsulation by the first processor 1801, so that the message gateway forwards the data of the predetermined type according to the destination address.

The second receiver 1901 is configured to receive data of a predetermined type and a destination address of the data of the predetermined type that are sent by the gateway, where the data of the predetermined type and the destination address are obtained by the gateway by detecting whether data transmitted in a received GTP-U data packet is the data of the predetermined type, and by decapsulating the GTP-U data packet if a result of the detection is that the data transmitted in the GTP-U data packet is the data of the predetermined type.

The second processor 1902 is configured to control the second transmitter 1903 to forward the data of the predetermined type according to the destination address received by the second receiver 1901.

The second transmitter 1903 is configured to forward, under the control of the second processor 1902, the data of the predetermined type according to the destination address received by the second receiver 1901.

Further, the first processor 1801 is configured to acquire a message type in a header of the GTP-U data packet; detect whether the message type is a predetermined message type; and if a result of the detection is that the message type is a predetermined message type, determine that the data transmitted in the received GTP-U data packet is the data of the predetermined type.

Further, if the gateway is a packet data gateway, the message type is set in advance by a radio access network element or by a serving gateway that is located between the radio access network element and the packet data gateway.

If the gateway is a serving gateway, the message type is set in advance by a radio access network element.

Further, the first processor 1801 is configured to acquire an identity of a bearer bearing the GTP-U data packet; detect whether the bearer identity is a predetermined message type; and if a result of the detection is that the bearer identity is a bearer identity, determine that the data transmitted in the received GTP-U data packet is the data of the predetermined type.

Further, the gateway may further include:
a first receiver 1803, further configured to: before the first processor 1801 detects whether the bearer identity is a predetermined bearer identity, if the gateway is a packet data gateway, receive the predetermined bearer identity that is from a mobility management network element and forwarded by a serving gateway, where the serving gateway is located between the mobility management network element and the packet data gateway; or if the gateway is a serving gateway, receive the predetermined bearer identity sent by a mobility management network element.

Further, the first processor 1801 is further configured to: if the gateway is a serving gateway, detect whether the GTP-U data packet carries a tunnel endpoint identifier of a radio access network element; and if a result of the detection is that the GTP-U data packet carries a tunnel endpoint identifier of a radio access network element, determine that data transmitted in the GTP-U data packet is data of a predetermined type.

In conclusion, in the data transmission system provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved. In addition, it is detected whether the GTP-U data packet carries a tunnel endpoint identifier of a radio access network element; and it is determined that the data transmitted in the received GTP-U data packet is the data of the predetermined type if a result of the detection is that the GTP-U data packet carries a tunnel endpoint identifier of a radio access network element, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 13

Figure 20:
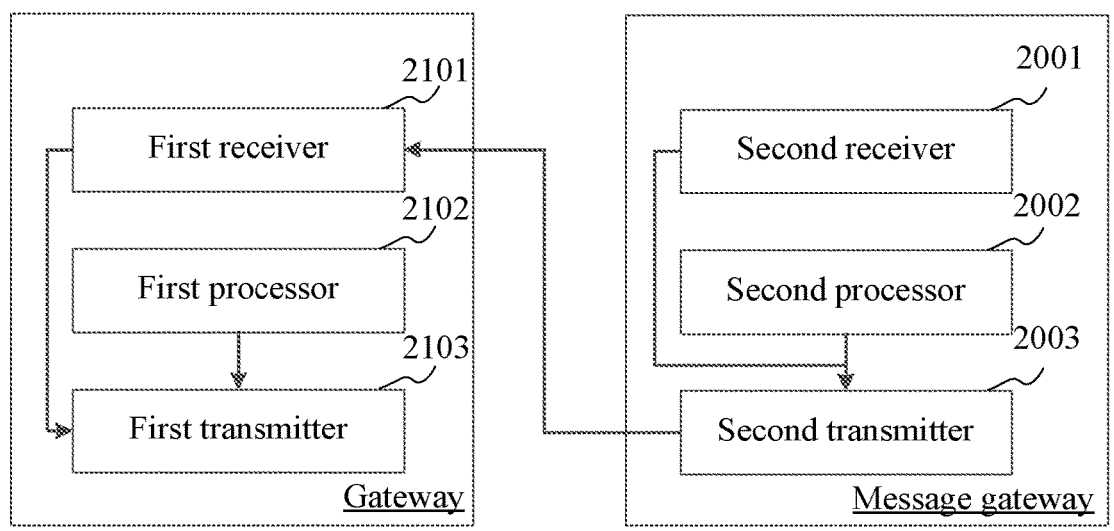
FIG. 20 is a schematic structural diagram of a data transmission system according to Embodiment 13 of the present invention.

Referring to FIG. 20, FIG. 20 shows a structural block diagram of a data transmission system according to Embodiment 13 of the present invention, where the data transmission system may be applied in an EPS. The data transmission system may include:

a second receiver 2001, configured to receive data of a predetermined type and a destination address of the data of the predetermined type;

a second processor 2002, configured to control a second transmitter 2003 to send, to a gateway, the data of the predetermined type and the destination address that are received by the second receiver 2001;

the second transmitter 2003, configured to send, under the control of the second processor 2002, the data of the predetermined type and the destination address that are received by the second receiver 2001 to the gateway, so that the gateway receives the data of the predetermined type and the destination address that are sent by a message gateway, and forwards a GTP-U data packet, where the GTP-U data packet is obtained by encapsulating the data of the predetermined type and the destination address;

a first receiver 2101, configured to receive data of a predetermined type and a destination address of the data of the predetermined type that are sent by a message gateway;

a first processor 2102, configured to control a first transmitter 2103 to forward a GTP-U data packet, where the GTP-U data packet is obtained by encapsulating the data of the predetermined type and the destination address that are received by the first receiver 2101; and the first transmitter 2103, configured to forward the GTP-U data packet under the control of the first processor 2102.

In conclusion, in the data transmission system provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved.

Embodiment 14

This embodiment of the present invention provides a data transmission system, where the data transmission system may be applied in an EPS. The data transmission system may include: a gateway and a message gateway; the gateway may include: a first receiver 2101, a first processor 2102, and a first transmitter 2103; and the message gateway may include: a second receiver 2001, a second processor 2002, and a second transmitter 2003.

The second receiver 2001 is configured to receive data of a predetermined type and a destination address of the data of the predetermined type.

The second processor 2002 is configured to control a second transmitter 2003 to send, to the gateway, the data of the predetermined type and the destination address that are received by the second receiver 2001.

The second transmitter 2003 is configured to send, under the control of the second processor 2002, the data of the predetermined type and the destination address that are received by the second receiver 2001 to the gateway, so that the gateway receives the data of the predetermined type and the destination address that are sent by the message gateway, and forwards a GTP-U data packet, where the GTP-U data packet is obtained by encapsulating the data of the predetermined type and the destination address.

The first receiver 2101 is configured to receive data of a predetermined type and a destination address of the data of the predetermined type that are sent by the message gateway.

The first processor 2102 is configured to control the first transmitter 2103 to forward a GTP-U data packet, where the GTP-U data packet is obtained by encapsulating the data of the predetermined type and the destination address that are received by the first receiver 2101.

The first transmitter 2103 is configured to forward the GTP-U data packet under the control of the first processor 2102.

Further, if the gateway is a serving gateway, the first transmitter 2103 is configured to: before forwarding the GTP-U data packet, send, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

Further, the first receiver 2101 is configured to receive the data of the predetermined type and the destination address that are from the message gateway and forwarded by a packet data gateway, where the packet data gateway is located between the serving gateway and the message gateway.

Further, if the gateway is a packet data gateway, the first transmitter 2103 is configured to forward the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, where the serving gateway is located between the mobility management network element and the packet data gateway.

In conclusion, in the data transmission system provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved. In addition, a downlink data notification carrying a predetermined data indication is sent to a mobility management network element, so that the mobility management network element sends, according to the downlink data notification, a paging message carrying the predetermined data indication, user equipment that receives the data of the predetermined type sends a pre-stored tunnel endpoint identifier of a serving gateway to a radio access network element after receiving the paging message, and the radio access network element establishes a bearer with the serving gateway according to the tunnel endpoint identifier of the serving gateway, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 15

Figure 21:
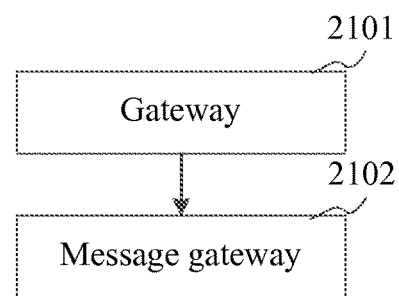
FIG. 21 is a schematic structural diagram of a data transmission system according to Embodiment 15 of the present invention.

Referring to FIG. 21, FIG. 21 shows a structural block diagram of a data transmission system according to Embodiment 15 of the present invention, where the data transmission system may be applied in an EPS. The data transmission system may include: a gateway 2101 and a message gateway 2102, where the gateway 2101 may be the gateway provided in Embodiment 7 or Embodiment 8, and the message gateway 2102 may be the message gateway provided in Embodiment 7 or Embodiment 8; or the gateway 2101 may be the gateway provided in Embodiment 11 or Embodiment 12, and the message gateway 2102 may be the message gateway provided in Embodiment 11 or Embodiment 12.

In conclusion, in the data transmission system provided by this embodiment of the present invention, it is detected whether data transmitted in a received GTP-U data packet is data of a predetermined type; if a result of the detection is that data transmitted in the GTP-U data packet is data of a predetermined type, the GTP-U data packet is decapsulated to obtain the data of the predetermined type and a destination address of the data of the predetermined type; and the data of the predetermined type and the destination address are sent to a message gateway; therefore, the problem of decreasing data transmission efficiency caused by a decrease in a payload of an IP data packet when an IP header is added in front of small data is solved, and an effect of improving the data transmission efficiency is achieved. In addition, it is detected whether the GTP-U data packet carries a tunnel endpoint identifier of a radio access network element; and it is determined that the data transmitted in the received GTP-U data packet is the data of the predetermined type if a result of the detection is that the GTP-U data packet carries a tunnel endpoint identifier of a radio access network element, a problem of a waste of signaling caused by that a transmission channel needs to be established in advance between a serving gateway and a radio access network element according to a Service Request message and then data is transmitted through the transmission channel is solved, and an effect of reducing signaling is achieved.

Embodiment 16

Figure 22:
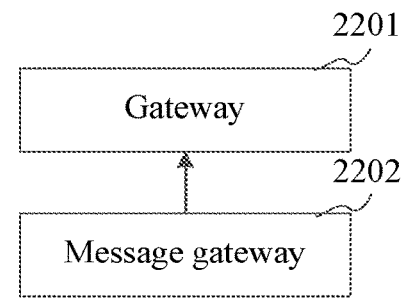
FIG. 22 is a schematic structural diagram of a data transmission system according to Embodiment 16 of the present invention.

Referring to FIG. 22, FIG. 22 shows a structural block diagram of a data transmission system according to Embodiment 16 of the present invention, where the data transmission system may be applied in an EPS. The data transmission system may include: a gateway 2201 and a message gateway 2202, where the gateway 2201 may be the gateway provided in Embodiment 9 or Embodiment 10, and the message gateway 2202 may be the message gateway provided in Embodiment 9 or Embodiment 10; or the gateway 2201 may be the gateway provided in Embodiment 13 or Embodiment 14, and the message gateway 2202 may be the message gateway provided in Embodiment 13 or Embodiment 14.

In conclusion, in the data transmission system provided by this embodiment, data of a predetermined type and a destination address of the data of the predetermined type that are sent by a message gateway are received; and a general packet radio service tunnelling protocol for the user plane GTP-U data packet is forwarded, where the GTP-U data packet is obtained by encapsulating the data of the predetermined type and the destination address, a problem of decreasing data transmission efficiency caused by a decrease in a payload of an IP data packet when an IP header is added in front of small data is solved, and an effect of improving the data transmission efficiency is achieved. In addition, by sending, to a mobility management network element, a downlink data notification carrying a predetermined data indication, so that the mobility management network element sends, according to the downlink data notification, a paging message carrying the predetermined data indication, user equipment that receives the data of the predetermined type sends a pre-stored tunnel endpoint identifier of a serving gateway to a radio access network element after receiving the paging message, and the radio access network element establishes a bearer with the serving gateway according to the tunnel endpoint identifier of the serving gateway, a problem of a waste of signaling caused by that a transmission channel needs to be established in advance between a serving gateway and a radio access network element according to a Service Request message and then data is transmitted through the transmission channel is solved, and an effect of reducing signaling is achieved.

It should be noted that the foregoing division of functional modules is only described for exemplary purposes when the gateway, the message gateway, and the data transmission system provided in the foregoing embodiments perform data transmission. In actual applications, the functions may be allocated to different functional modules according to specific needs, which means that the internal structure of the gateway, the message gateway, and the data transmission system is divided into different functional modules to complete all or some of the functions described above. In addition, the gateway, message gateway, and data transmission system provided by the foregoing embodiments are based on the same concept as the embodiment of the data transmission method. For the specific implementation process, refer to the method embodiment, and the details are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A data transmission method, used in a gateway, wherein the method comprises:
acquiring an identity of a bearer bearing the GTP-U data packet;
detecting whether the bearer identity is a predetermined bearer identity; and
if a result of the detection is that the bearer identity is a predetermined bearer identity, determining that the data transmitted in the received GTP-U data packet is the data of the predetermined type;
if a result of the detection is that data transmitted in the GTP-U data packet is data of a predetermined type, decapsulating the GTP-U data packet, to obtain the data of the predetermined type and a destination address of the data of the predetermined type; and
sending the data of the predetermined type and the destination address to a message gateway, so that the message gateway forwards the data of the predetermined type according to the destination address;
before the detecting whether the bearer identity is a predetermined bearer identity, the method further comprising:
if the gateway is a packet data gateway, receiving the predetermined bearer identity that is from a mobility management network element and forwarded by a serving gateway, wherein the serving gateway is located between the mobility management network element and the packet data gateway; or
if the gateway is a serving gateway, receiving the predetermined bearer identity sent by a mobility management network element.

2. The data transmission method according to claim 1, wherein the detecting whether data transmitted in a received general packet radio service tunneling protocol for the user plane GTP-U data packet is data of a predetermined type comprises:
acquiring a message type in a header of the GTP-U data packet;
detecting whether the message type is a predetermined message type; and
if a result of the detection is that the message type is a predetermined message type, determining that the data transmitted in the received GTP-U data packet is the data of the predetermined type.

3. The data transmission method according to claim 2, wherein
if the gateway is a packet data gateway, the message type is set in advance by a radio access network element or by a serving gateway that is located between the radio access network element and the packet data gateway; or
if the gateway is a serving gateway, the message type is set in advance by a radio access network element.

4. The data transmission method according to claim 1, wherein if the gateway is a serving gateway, the detecting whether data transmitted in a received general packet radio service tunneling protocol for the user plane GTP-U data packet is data of a predetermined type comprises:
detecting whether the GTP-U data packet carries a tunnel endpoint identifier of a radio access network element; and
if a result of the detection is that the GTP-U data packet carries a tunnel endpoint identifier of a radio access network element, determining that the data transmitted in the received GTP-U data packet is the data of the predetermined type.

5. A gateway, comprising:
a first processor, configured to detect whether data transmitted in a received general packet radio service tunneling protocol for the user plane GTP-U data packet is data of a predetermined type; and if a result of the detection is that data transmitted in the GTP-U data packet is data of a predetermined type, decapsulate the GTP-U data packet, to obtain the data of the predetermined type and a destination address of the data of the predetermined type; and
a first transmitter, configured to send, to a message gateway, the data of the predetermined type and the destination address that are obtained through decapsulation by the first processor, so that the message gateway forwards the data of the predetermined type according to the destination address;
wherein the first processor is configured to obtain an identity of a bearer bearing the GTP-U data packet; detect whether the bearer identity is a predetermined bearer identity; and if a result of the detection is that the bearer identity is a predetermined bearer identity, determine that the data transmitted in the received GTP-U data packet is the data of the predetermined type;
wherein the gateway further comprises:
a first receiver, configured to: before the first processor detects whether the bearer identity is a predetermined bearer identity, if the gateway is a packet data gateway, receive the predetermined bearer identity that is from a mobility management network element and forwarded by a serving gateway, wherein the serving gateway is located between the mobility management network element and the packet data gateway; or if the gateway is a serving gateway, receive the predetermined bearer identity sent by a mobility management network element.

6. The gateway according to claim 5, wherein the first processor is configured to obtain a message type in a header of the GTP-U data packet; detect whether the message type is a predetermined message type; and if a result of the detection is that the message type is a predetermined message type, determine that the data transmitted in the received GTP-U data packet is the data of the predetermined type.

7. The gateway according to claim 6, wherein
if the gateway is a packet data gateway, the message type is set in advance by a radio access network element or by a serving gateway that is located between the radio access network element and the packet data gateway; or
if the gateway is a serving gateway, the message type is set in advance by a radio access network element.

8. The gateway according to claim 5, wherein the first processor is further configured to: if the gateway is a serving gateway, detect whether the GTP-U data packet carries a tunnel endpoint identifier of a radio access network element; and if a result of the detection is that the GTP-U data packet carries a tunnel endpoint identifier of a radio access network element, determine that data transmitted in the GTP-U data packet is data of a predetermined type.

9. A gateway, comprising:
a first receiver, configured to receive data of a predetermined type and a destination address of the data of the predetermined type that are sent by a message gateway;

a first processor, configured to control a first transmitter to forward a general packet radio service tunneling protocol for the user plane GTP-U data packet, wherein the GTP-U data packet is obtained by encapsulating the data of the predetermined type and the destination address that are received by the first receiver; and the first transmitter, configured to forward the GTP-U data packet under the control of the first processor;

wherein if the gateway is a serving gateway, the first transmitter is configured to: before forwarding the general packet radio service tunneling protocol for the user plane GTP-U data packet, send, to a mobility management network element, a downlink data notification carrying a predetermined data indication, so that the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, and the radio access network element establishes a bearer with the serving gateway according to the tunnel endpoint identifier of the serving gateway.

10. The gateway according to claim 9, wherein the first receiver is configured to receive the data of the predetermined type and the destination address that are from the message gateway and forwarded by a packet data gateway, wherein the packet data gateway is located between the serving gateway and the message gateway.

11. The gateway according to claim 9, wherein if the gateway is a packet data gateway, the first transmitter is configured to forward the data of the predetermined type, the destination address, and a predetermined data indication to a serving gateway, so that the serving gateway sends, to a mobility management network element, a downlink data notification carrying the predetermined data indication, the mobility management network element sends, according to the downlink data notification, a paging message carrying the predetermined data indication, the user equipment that receives the data of the predetermined type sends a pre-stored tunnel endpoint identifier of the serving gateway to a radio access network element after receiving the paging message, the radio access network element establishes a bearer with the serving gateway according to the tunnel endpoint identifier of the serving gateway, and after encapsulating the data of the predetermined type and the destination address into the GTP-U data packet, the serving gateway forwards the GTP-U data packet to the radio access network element, wherein the serving gateway is located between the mobility management network element and the packet data gateway.

* * * * *

UNITED STATES PATENT AND TRADEMARK OFFICE
CERTIFICATE OF CORRECTION

PATENT NO. : 9,992,109 B2
APPLICATION NO. : 14/947027
DATED : June 5, 2018
INVENTOR(S) : Chunguang Wang et al.

Page 1 of 1

It is certified that error appears in the above-identified patent and that said Letters Patent is hereby corrected as shown below:

On the Title Page

Item [73] (Assignee), Line 14:
Delete "Shenzen (CN)" and insert -- Shenzhen (CN) --, therefore.

Signed and Sealed this
Tenth Day of July, 2018

Andrei Iancu
*Director of the United States Patent and Trademark Office*